(12) United States Patent
Hannu et al.

(10) Patent No.: US 7,787,377 B2
(45) Date of Patent: Aug. 31, 2010

(54) SELECTIVE REDUNDANCY FOR VOICE OVER INTERNET TRANSMISSIONS

(75) Inventors: Hans Hannu, Lulea (SE); Marten Ericson, Lulea (SE); Stefan Wanstedt, Lulea (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 910 days.

(21) Appl. No.: 11/278,740

(22) Filed: Apr. 5, 2006

(65) Prior Publication Data

US 2007/0183323 A1    Aug. 9, 2007

Related U.S. Application Data

(60) Provisional application No. 60/764,773, filed on Feb. 3, 2006.

(51) Int. Cl.
    *H04L 12/26* (2006.01)
(52) U.S. Cl. ............... 370/235; 370/252; 370/310; 370/389; 714/6
(58) Field of Classification Search ........... 370/235, 370/252, 253, 310, 389, 356, 401, 412; 709/223–226; 714/1–6
See application file for complete search history.

(56) References Cited

U.S. PATENT DOCUMENTS

| | | | |
|---|---|---|---|
| 6,219,339 B1* | 4/2001 | Doshi et al. | 370/235 |
| 2003/0110435 A1 | 6/2003 | Wu et al. | |
| 2003/0156573 A1* | 8/2003 | Tran et al. | 370/349 |
| 2003/0210660 A1 | 11/2003 | Wiberg et al. | |
| 2004/0081159 A1* | 4/2004 | Pan et al. | 370/395.2 |
| 2005/0013249 A1 | 1/2005 | Kong et al. | |
| 2006/0146749 A1 | 7/2006 | Lundh et al. | |
| 2006/0268813 A1 | 11/2006 | Larsson et al. | |
| 2006/0268837 A1 | 11/2006 | Larsson et al. | |
| 2006/0268848 A1 | 11/2006 | Larsson et al. | |
| 2006/0268849 A1 | 11/2006 | Larsson et al. | |
| 2006/0268900 A1 | 11/2006 | Larsson et al. | |

(Continued)

FOREIGN PATENT DOCUMENTS

EP    1 641 170 A2    3/2006

(Continued)

OTHER PUBLICATIONS

International Search Report mailed Jan. 19, 2007 in corresponding PCT application PCT/SE2006/050118.

(Continued)

*Primary Examiner*—Ricky Ngo
*Assistant Examiner*—Gary Mui
(74) *Attorney, Agent, or Firm*—Nixon & Vanderhye, P.C.

(57) ABSTRACT

Adaptive redundancy is implemented (either switched on or off) for a voice over internet protocol (VoIP) packet connection by a basic two step approach. A first step of adaptive redundancy implementation involves monitoring relevant sources or indicators to determine when the need for redundancy (e.g., redundancy coding) may arise. A second step of adaptive redundancy implementation involves the triggering of redundancy implementation events when the monitored sources reach or obtain certain threshold value(s) (threshold). The first and second steps of redundancy implementation can be repeated as needed. Scenarios of adaptive redundancy implementation include both network-initiated implementations (e.g., implementations initiated by a radio access network (RAN)) and mobile-initiated implementations (e.g., implementations initiated by a wireless station).

48 Claims, 19 Drawing Sheets

U.S. PATENT DOCUMENTS

2007/0127522 A1 6/2007 Lundh et al.
2007/0133515 A1* 6/2007 Kumar et al. ............... 370/352

FOREIGN PATENT DOCUMENTS

JP 2000-188609 A 7/2000
WO 02/058345 A2 7/2002

OTHER PUBLICATIONS

Written Opinion mailed Jan. 19, 2007 in corresponding PCT application PCT/SE2006/050118.

Johansson, Ingemar, et al., "Bandwidth Efficient AMR Operations for VOIP", IEEE 2002.

* cited by examiner

SCENARIO S1:
NETWORK-
INITIATED ADAPTIVE
REDUNDANCY

SCENARIO S2:
MOBILE-INITIATED ADAPTIVE
REDUNDANCY: DOWNLINK-
ACTIVATED: MONITORING
RECEIVER BUFFER

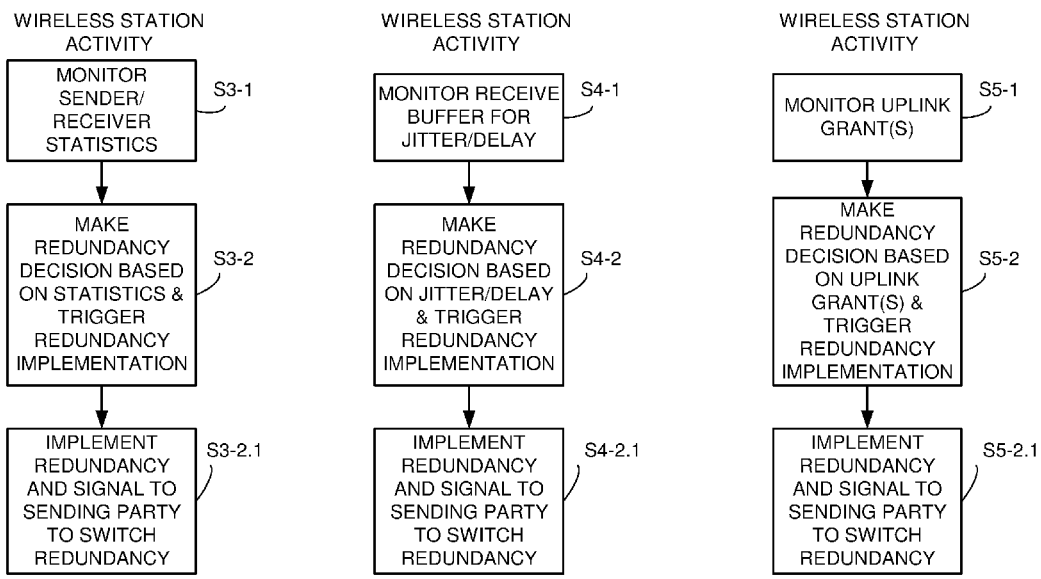

SCENARIO S6:
MOBILE-INITIATED ADAPTIVE REDUNDANCY: UPLINK-ACTIVATED: MONITORING UPLINK NAKS

SCENARIO S7:
MOBILE-INITIATED ADAPTIVE REDUNDANCY: UPLINK-ACTIVATED: MONITORING TRANSMISSION BUFFER

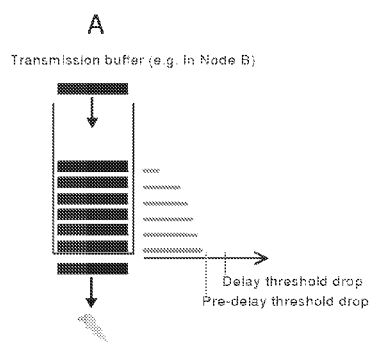
FIG. 16A
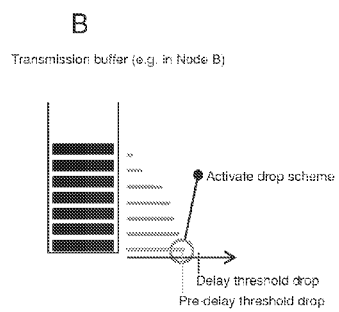
FIG. 16B
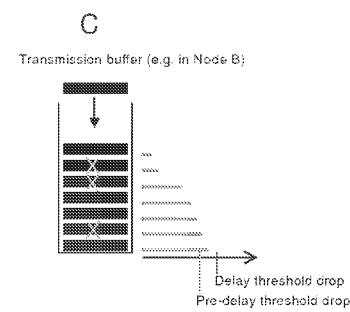
FIG. 16C
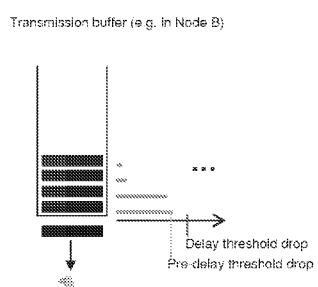
FIG. 16D
FIG. 16E
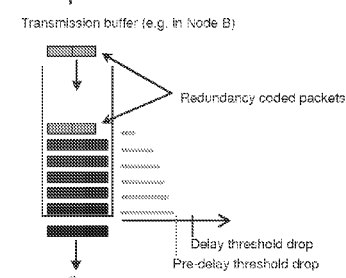
FIG. 16F SCENARIO S6: NETWORK-INITIATED ADAPTIVE REDUNDANCY: DOWNLINK-ACTIVATED: MAC-HS DELAY SCHEDULING TRANMISSION

SELECTIVE REDUNDANCY FOR VOICE OVER INTERNET TRANSMISSIONS

BACKGROUND

This application claims the benefit and priority of U.S. Provisional Patent Application 60/764,773 filed Feb. 3, 2006, which is incorporated herein by reference in its entirety.

FIELD OF THE INVENTION

The present invention pertains generally to telecommunications, and particularly to adaptive implementation of redundancy for packet transmissions in a radio access network, such as Voice over Internet Protocol (VoIP) packet transmissions, for example.

RELATED ART AND OTHER CONSIDERATIONS

In a typical cellular radio system, mobile terminals (also known as mobile stations and mobile user equipment units (UEs)) communicate via a radio access is network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

Each of these example services happen to be built upon the Global System for Mobile communications (GSM), a second generation ("2G") digital radio access technology originally developed for Europe. GSM was enhanced in 2.5 G to include technologies such as GPRS.

The Universal Mobile Telecommunications System (UMTS) provides improved mobile communication services based on Wideband Code Division Multiple Access (WCDMA) access technology. UMTS is a third generation mobile communication system which evolved from the Global System for Mobile communications (GSM), a second generation ("2G") digital radio access technology originally developed for is Europe. The third generation (3G) comprises mobile telephone technologies covered by the International Telecommunications Union (ITU) IMT-2000 family. The Third Generation Partnership Project (3GPP) is a group of international standards bodies, operators, and vendors working toward standardizing WCDMA-based members of the IMT-2000

As wireless Internet services have become popular, various services require higher data rates and higher capacity. Although UMTS has been designed to support multi-media wireless services, the maximum data rate is not enough to satisfy the required quality of services.

In the Third Generation Partnership Project (3GPP), telecommunications suppliers propose and agree upon standards for third generation networks and UTRAN specifically, and investigate enhanced data rate and radio capacity. One result of the forum's work is the High Speed Downlink Packet Access (HSDPA). See, e.g., 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6), which discusses High Speed Downlink Packet Access (HSDPA) and which is incorporated herein by reference in its entirety. Also incorporated by reference herein as being produced by the forum and having some bearing on High Speed Downlink Packet Access (HSDPA) or concepts described herein include: 3GPP TS 25.425 V6.2.0 (2005-06), 3rd Generation Partnership Project; Technical Specification Group Radio Access Network; UTRAN Iur interface user plane protocols for Common Transport Channel data streams (Release 6); and 3GPP TS 25.433 V6.6.0 (2005-06), 3rd Generation Partnership Project; Technical Specification Group Radio Access Network; UTRAN Iub interface Node B Application Part (NBAP) signaling (Release 6).

High Speed Downlink Packet Access (HSDPA) is a packet-based data service in W-CDMA downlink with data transmission up to 8-10 Mbps over a 5 MHz bandwidth in WCDMA downlink. HSDPA implementations include fast Adaptive Modulation and Coding (AMC) based on link quality and Hybrid Automatic Request (HARQ), controlled by the base station. Transmission occurs over the entire available bandwidth in time-multiplexed intervals (called transmission time intervals (TTI)). HSDPA achieves lower latency (and possibly higher data speeds) by shifting some of the radio resource coordination and management responsibilities to the base station from the radio network controller. Those responsibilities include one or more of the following: high speed downlink shared channel transmission (HS-DSCH), higher order modulation, link adaptation, radio channel dependent scheduling, and hybrid-ARQ with soft combining. In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

High Speed Downlink Packet Access (HSDPA) is discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL";

U.S. Patent application Ser. No. 11/292,304, filed Dec. 2, 2005, entitled "FLOW CONTROL FOR LOW BITRATE USERS ON HIGH SPEED DOWNLINK";

PCT Patent Application PCT/SE2005/001247, filed Aug. 26, 2005;

PCT Patent Application PCT/SE2005/001248, filed Aug. 26, 2005.

Voice over Internet Protocol (VoIP) in the mobile world means using a packet switched (PS) service for transport of Internet Protocol (IP) packets (which contain, e.g., Adaptive Multi-Rate codec (AMR) speech frames) for normal mobile phone calls. In circuit-switched networks, network resources are static from the sender to receiver before the start of the transfer, thus creating a "circuit". The resources remain dedicated to the circuit during the entire transfer and the entire message follows the same path. In packet-switched networks, the message is broken into packets, each of which can take a different route to the destination where the packets are recompiled into the original message. The packet switched (PS) service utilized for VoIP can be, for example, GPRS (General Packet Radio Service), EDGE (Enhanced Data Rates for Global Evolution), or WCDMA (Wideband Code Division Multiple Access).

Voice over Internet Protocol (VoIP) is discussed in one or more of the following (all of which are incorporated by reference herein in their entirety):

U.S. patent application Ser. No. 11/298,939, filed Dec. 12, 2005, entitled "CONNECTION TYPE HANDOVER OF VOICE OVER INTERNET PROTOCOL CALL BASED ON RESOURCE TYPE";

U.S. patent application Ser. No. 11/298,938, filed Dec. 12, 2005, entitled "CONNECTION TYPE HANDOVER OF VOICE OVER INTERNET PROTOCOL CALL BASED ON LOW QUALITY DETECTION";

U.S. patent application Ser. No. 11/288,436, filed Nov. 29, 2005, entitled "SCHEDULING RADIO RESOURCES FOR SYMMETRIC SERVICE DATA CONNECTIONS";

U.S. patent application Ser. No. 11/298,939, filed on Dec. 12, 2005 and entitled "Connection Type Handover Of Voice Over Internet Protocol Call Based On Resource Type";

U.S. patent application Ser. No. 11/314,973, filed on Dec. 22, 2005 and entitled "Local Switching of Calls Setup by a Multimedia Core Network";

U.S. patent application Ser. No. 11/346,565, filed Feb. 3, 2006 and entitled "Enhanced VoIP Media Flow Quality by Adapting Speech Encoding Based on Selection Modulation and Coding Schemes (MCS);

U.S. patent application Ser. No. 11/288,436, filed on Nov. 29, 2005 and entitled "Scheduling Radio Resources For Symmetric Service Data Connections";

The number of VoIP service users is growing in the world, in particular is through the fixed Internet. VoIP is also being thought of as a cellular service, and one major reason for this is that the service gives the operators an opportunity to converge their networks into one all IP-based network.

Application redundancy for VoIP over HSDPA/EUL (Enhanced UpLink) is one way of increasing the system capacity for VoIP in a WCDMA system, without degrading the speech capacity compared to the non-redundant coded real time protocol (RTP) packets. There are a number of concepts for VoIP application redundancy, e.g. full redundancy, selective redundancy and partial redundancy. Selective redundancy is when some, but not all, voice frames are duplicated i.e. sent in consecutive packets. In selective redundancy, the frames that are often sent twice (or more) are the important onset voice frames, e.g., the frames which "holds the energy of the speech" and which are sent in the beginning of a talk spurt. Partial redundancy, on the other hand, is when only a few parameters of some of the frames are duplicated. In partial redundancy, the frames having parameters which are duplicated are the so called Voiced frames, i.e. frames that put in some energy during a talk spurt. Partial redundancy can be seen as a complement to selective redundancy.

Thus, the redundancy concepts (e.g., full, selective, and partial) differ mainly in how much and what information is redundant between consecutive packets. In general and from a system capacity point of view, the capacity of VoIP applications is related to bit rate and packet loss rate toleration, e.g., the lower the bit rate and the higher the packet loss rate tolerated, the higher the capacity.

The Adaptive Multi-Rate (AMR) voice codec rate is based on experienced Bit Error Rate (BER) or Frame Erasure Rate (FER). AMR decreases the codec bit rate and increases the channel coding if the BER/FER increases. Further, RTCP reports have been used to receive information about the experienced channel characteristics of a channel.

Redundancy coding allows for a higher packet loss rate without degrading the voice quality, at least when the loss events are mostly single packet losses. However, during low packet loss rate (<1-2%) the use of redundancy coding, as described above, impacts the voice quality negatively since, in general, a lower codec rate has worse voice quality (compare e.g. AMR mode 5.9 kbps with AMR mode 12.2 kbps).

The dilemma thus encompasses two problems: First, how to know that a point or time to activate or turn on redundancy coding is getting near, in order to maintain voice quality. Second, how the end user party (VoIP clients) gains information for timing a switch to redundancy coding.

What is needed, therefore, and an object herein provided for, are means, methods, and techniques for effectively implementing redundancy coding in such a way that the VoIP application quality is not decreased and/or capacity is increased.

SUMMARY

As a general solution, redundancy may be implemented (either switched on or off) for a voice over internet protocol (VoIP) packet connection by a basic two step approach. A first step of adaptive redundancy implementation involves monitoring relevant sources or indicators to determine when the need for redundancy (e.g., redundancy coding) may arise. The monitored sources can be one or more of a transmission buffer(s); a receiving buffer(s); sender and/or receiver statistics. An example of such statistics are the statistics which can be obtained from RTCP protocol, e.g., number of packets/data bytes sent, number of packets/data bytes lost, jitter, etc.

A second step of adaptive redundancy implementation involves the triggering of redundancy implementation events when the monitored sources reach or obtain certain threshold value(s) (threshold). Examples of such thresholds (one or more of which may be utilized) include: a number of packets (or bytes of data) in a transmission buffer; a number of lost packets (or bytes of data) calculated from a reception buffer; and, requisite sender and receiver statistics (such as number of packets/data bytes sent and/or being lost has reached a maximum/minimum amount). Examples of the second step implementation events thusly triggered include one or more of the following: (1) dropping or removing a number of packets (or bytes of data) in the transmission buffer, and (2) triggering a signaling message to the sending client and/or receiving client to switch on/off redundancy coding. The dropping/removing in a controlled manner by the network (for example at the MAC-hs entity) of packets is performed in order to trigger the use of redundancy coding before the voice quality becomes degraded. The first and second steps of redundancy implementation can be repeated as needed.

Scenarios of adaptive implementation of redundancy include both network-initiated implementations (e.g., implementations initiated by a radio access network (RAN)) and mobile-initiated implementations (e.g., implementations initiated by a wireless station, one example of which is a mobile station). One example network-initiated implementation involves redundancy initiation based on downlink activity.

The mobile-initiated implementations include both implementations initiated on downlink activity and implementations initiated on uplink activity. For example, one example embodiment of a mobile-initiated implementation initiated on downlink activity involves monitoring lost packets in a receiving buffer; another example embodiment involves monitoring sender/receiver statistics; yet another example embodiment involves monitoring jitter/delay in a receiving buffer. In terms of uplink-related activity, one example embodiment of a mobile-initiated implementation initiated on uplink activity involves monitoring uplink grants; another example embodiment of a mobile-initiated implementation initiated on uplink activity involves monitoring enhanced uplink negative acknowledgements (NAKs); yet another example embodiment of a mobile-initiated implementation initiated on uplink activity involves monitoring a transmission buffer of the mobile station.

Thus, in one of its aspects, the technology concerns a method of operating a telecommunications network comprising steps of monitoring a flow or an indicator for a flow of packets in a voice over internet protocol (VoIP) connection (session) for determining a need for redundancy of at least some packet content for the packets; and, adaptively implementing the redundancy in accordance with the monitoring. The indicator can be obtained from a buffer wherein the packets of the flow are at least temporarily stored, and wherein the monitoring of the indicator comprises comparing the indicator to a threshold.

In one example embodiment and node, the buffer is a transmission buffer of a network node, and the indicator is related to a number of packets resident in the transmission buffer. For example, the buffer can be a medium access control (MAC) high speed buffer (e.g., High Speed Downlink Packet Access (HSDPA) buffer) of the network node.

In another example embodiment and mode, the buffer is a reception buffer of a mobile station. In accordance with varying implementations, the indicator can be related to a number of packets lost from the reception buffer, related to packet delay in the reception buffer; and/or related to packet jitter in the reception buffer.

In yet another example embodiment and mode, the buffer is a transmission buffer of a mobile station, and wherein the indicator is related to a number of packets resident in the transmission buffer.

In yet another example embodiment and mode, the indicator can be related to uplink activity of the connection from a mobile station to a network node. For example, the indicator can be related to uplink grants for the connection. Additionally or alternatively, the indicator can be related to uplink negative acknowledgments occurring for the connection.

The step of adaptively implementing the redundancy can comprise, e.g., directing a first party or client involved in the connection to switch between redundancy modes. For example, directing a first party or client involved in the connection to switch between redundancy modes can be accomplished by changing redundancy indication bits of a packet, e.g., by changing change mode request (CMR) bits of a RTP packet.

In accordance with yet another aspect, the first party or client involved in the connection can signal a second party involved in the connection to switch between redundancy modes. For example, the first party involved in the connection can signal a second party involved in the connection by changing change mode request (CMR) bits of a RTP packet. Alternatively or additionally, the first party involved in the connection signals a second party involved in the connection by using a session initiation protocol (SIP) update.

Adaptively implementing the redundancy can, in one example embodiment and mode, comprise removing at least some packets from a transmission buffer when a number of packets in the transmission buffer reaches a pre-discard delay threshold. As mentioned previously, the dropping /removing in a controlled manner by the network (for example at the MAC-hs entity) of packets is performed in order to trigger the use is of redundancy coding before the voice quality becomes degraded. Removal of packets from the transmission buffer continues until one or more of the following occur: (1) redundant coded packets are received in the transmission buffer; (2) the transmission buffer is filled up to an ordinary delay drop/discard threshold; (3) a transmission buffer fill level is decreased below a predetermined threshold; and/or (4) the packet drop rate exceeds a given total user packet loss rate (e.g. 1%).

In another of its aspects, the current technology concerns a node of a telecommunications network which comprises a monitor for monitoring a flow or an indicator for a flow of packets in a connection between a first party and a second party. A redundancy controller of the node uses the indicator for adaptively making a determination of a need for redundancy of at least some packet content for the packets and adaptively implements the redundancy in accordance with the determination. In an example implementation, the node comprises a transmission buffer for storing packets of the flow, and the monitor checks and/or monitors packets in the transmission buffer. As a non-limiting example implementation, the transmission buffer is a medium access control (MAC) high speed buffer. Other example, non-limiting aspects of the network node are understood from the foregoing method discussion.

In another of its aspects, the current technology concerns a mobile station which communicates as a first party or first client over an air interface with a telecommunications network. The mobile station comprises a monitor for monitoring an indicator for a flow of packets in a connection with a second party/client; redundancy controller for using the indicator for adaptively making a determination of a need for redundancy of at least some packet content for the packets and for adaptively implementing the redundancy in accordance with the determination. Other example, non-limiting aspects of the mobile station are understood from the foregoing method discussion.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, is emphasis instead being placed upon illustrating the principles of the invention.

FIG. 7 is a flow chart illustrating example, basic, representative, non-limiting steps or events of the third scenario of adaptive redundancy.

FIG. 8 is a flow chart illustrating example, basic, representative, non-limiting steps or events of a fourth scenario of adaptive redundancy.

FIG. 10 is a flow chart illustrating example, basic, representative, non-limiting steps or events of the fifth scenario of adaptive redundancy.

FIG. 16A-FIG. 16F are diagrammatic views illustrating adapted example steps or events of the eighth scenario of a adaptive transmission redundancy.

DETAILED DESCRIPTION OF THE DRAWINGS

Figure 1:
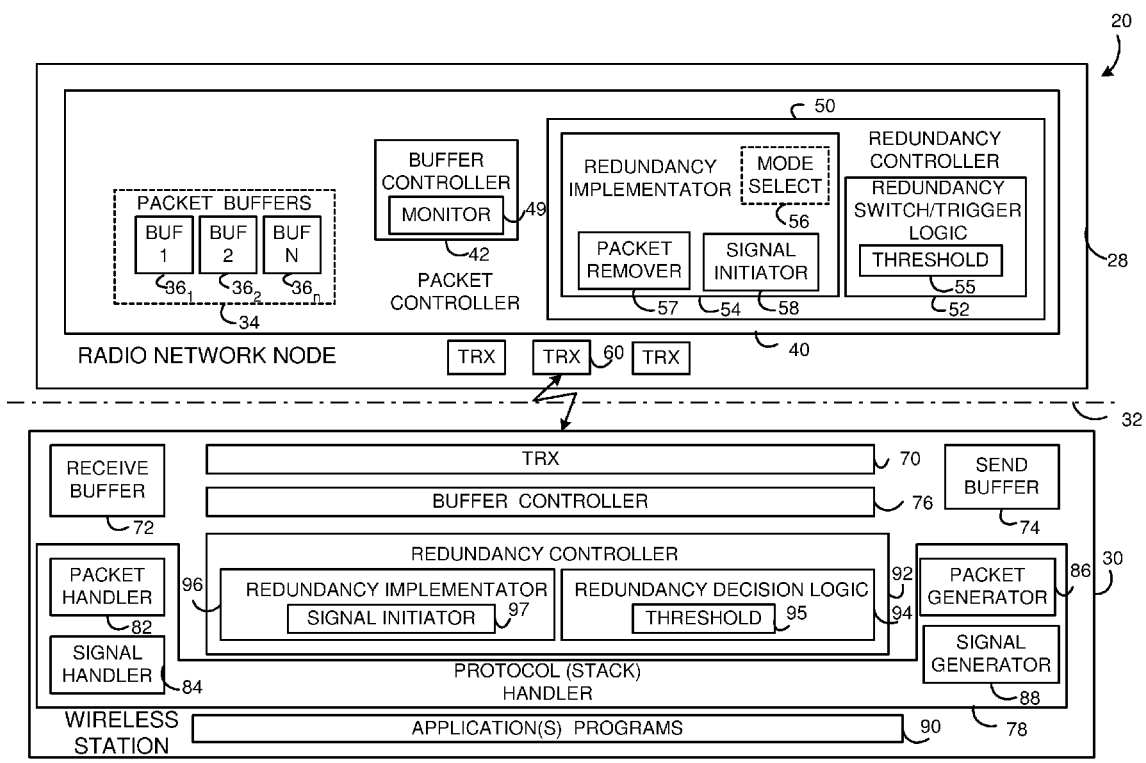
FIG. 1 is a schematic view of portions of an example, representative, non-limiting embodiment of a communications network having adaptive redundancy.

In the following description, for purposes of explanation and not limitation, specific details are set forth such as particular architectures, interfaces, techniques, etc. in order to provide a thorough understanding of the present invention. However, it will is be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Disclosed herein are various example embodiments and implementations for is providing adaptive redundancy for a flow of packets involved in a packet connection which is at least partially carried over an air interface, e.g., in which at least one party is a wireless station. As used herein, the term "wireless station" encompasses and includes a mobile station, a user equipment unit (UE), or a mobile terminal, as before discussed. The technology includes, in its differing aspects, not only methods of operating a telecommunications network for providing such adaptive redundancy, but also a radio network node which facilitates such adaptive redundancy, as well as a wireless station capable of operating in accordance with and also facilitating such adaptive redundancy.

FIG. 1 illustrates an example embodiment of a communications network 20 in which adaptive redundancy according to varying implementations or aspects of the present technology can be implemented. The communications network 20 of FIG. 1 includes a radio network node 28 and a wireless station 30. The radio network node 28 communicates over an air or radio interface 32 with wireless station 30. The wireless station 30 can be considered as a first party or first client for a given packet switched connection which carries voice and/or audio. A second party or second client for the packet connection can be a second wireless station or a wired station connected via a core network. Accordingly, it will be understood that the radio network node 28 illustrated in FIG. 1 can be connected to one or more core networks, examples of such connection to core network(s) being hereinafter described.

The radio network node 28 includes a pool 34 of buffers, such as buffers $36_1$-$36_n$ illustrated in FIG. 1. The buffers 36 of pool 34 are preferably packet buffers, and can be allocated for different packet connections in which radio network node 28 participates. The types of packets which can be stored in buffers 36 particularly include, but are not limited to, packets involved in a packet switched connection which carries voice and/or audio. Each of the buffers 36 can function either as a transmission buffer or a reception buffer, as allocated and/or as needed. In this sense, packets in a transmission buffer are packets destined to wireless station 30 over air interface 32, while packets in a reception buffer are packets obtained from wireless station 30 over air interface 32. In addition to pool 34 of buffers, the packet controller 40 of radio network node 28 includes buffer controller 42.

In the particular implementation in which buffers 36 are packet buffers, the pool 34 can be included in and/or administered by a packet controller 40. The packet controller 40 is responsible for handling of packets including, e.g., preparation and processing of packets for transmission on a downlink to wireless station 30 and processing of packets received on the uplink from wireless station 30.

As mentioned above, the packet switched connection in which the parties (clients) participate carry voice and/or audio. One non-limiting example of such a connection is a voice over Internet Protocol (VoIP) connection. Hereinafter, for sake of convenience, specific reference is made to an illustrative example of a VoIP connection. Such reference should be understood not to be limiting, but merely representative of one example type of packet switched connection.

The technology described herein affords adaptive redundancy, e.g., a changing or switching between redundancy modes. As used herein, switching or changing between redundancy modes encompasses changing from one of the following modes to another of the following modes: full redundancy, partial redundancy, selective redundancy, and no redundancy.

When full redundancy is in effect, the content of each packet is repeated in at least one other packet (e.g., a duplicate voice-(codec) frame is provided) in order to allow increased opportunity for content recovery. In other words, full redundancy means basically that voice frames are sent twice, in two consecutive packets. When no redundancy is in effect, packet content is not deliberately or precautiously replicated or repeated in another packet.

As previously explained, selective redundancy is when some, but not all, voice frames are duplicated i.e. sent in consecutive packets. In selective redundancy, the frames that are often sent twice (or more) are the important onset voice frames, e.g., the frames which "holds the energy of the speech" and which are sent in the beginning of a talk spurt.

Partial redundancy, on the other hand, is when only a few parameters of some of the frames are duplicated. In partial redundancy, the frames having parameters which are duplicated are the so called Voiced frames, i.e. frames that put in some energy during a talk spurt.

In the example embodiment of FIG. 1, adaptive redundancy is implemented at radio network node 28. To this end, packet controller 40 of FIG. 1 is further illustrated as including redundancy controller 50. The functionalities of packet controller 40, buffer manager or controller 42, and redundancy controller 50 can be performed by a single controller or processor, or distributed to different controllers or processors. The four functionalities are illustrated as differentiated only for convenience in describing their respective activities.

The buffer controller 42 serves, e.g., for managing the storing of packets destined to or received from wireless station 30, and for hosting, coordinating, or facilitating any processing of those packets as deemed necessary during residency of the packet at radio network node 28. Thus, buffer controller 42 accepts packets from a higher protocol or higher node of the network which are destined to wireless station 30, and stores those packets in the pool 34 of buffers. In addition, in accordance with an example non-limiting embodiment, for assisting the adaptive redundancy, buffer controller 42 comprises buffer monitor 49.

In the example embodiment of FIG. 1, redundancy controller 50 comprises redundancy switch/trigger logic 52 and redundancy implementor 54. The redundancy switch/trigger logic 52 is responsible for determining when to change or switch from one redundancy mode to another redundancy mode, thereby facilitating the adaptive redundancy of the present technology. To this end, in at least one example embodiment, redundancy switch/trigger logic 52 includes a threshold memory 55 or the like in which are stored threshold values or criteria utilized in determining when to switch redundancy modes or trigger implementation of a new redundancy mode. As explained hereinafter, switching to or triggering a particular mode of redundancy can involve redundancy switch/trigger logic 52 performing a comparison of a parameter kept by buffer monitor 49 with a threshold value stored in threshold memory 55.

Once the redundancy switch/trigger logic 52 has made a determination that a redundancy mode change is to occur, redundancy implementor 54 becomes responsible for carrying out the actions necessary for implementing the desired mode of redundancy. Moreover, redundancy implementor 54 can include logic for determining what the new redundancy mode will or should be. In some implementations, the redundancy implementor 54 may imply change between full redundancy and no redundancy. Yet in other implementations, changing or switching between redundancy modes can involve changing/switching either (1) between no redundancy and selective redundancy; or (2) between no redundancy and partial redundancy. As used herein, "switching on/off" redundancy coding or similar language can include switching between no redundancy and one of the following: full redundancy, selective redundancy, and partial redundancy.

In yet other implementations, the redundancy implementor 54 may be more sophisticated or intelligent. For example, when an intelligent redundancy implementor 54 realizes that a change needs to be made from the no redundancy mode to another mode, the intelligent redundancy implementor 54 can select the new mode, e.g., determine whether full redundancy, selective redundancy, partial redundancy, or lower codec bit rate mode is more appropriate, for example. For such intelligent implementations, redundancy implementor 54 includes a mode select logic 56 (as shown by broken lines in FIG. 2 to reflect its optional use in the intelligent embodiment). The mode select logic 56 can decide the new mode by taking into consideration factors such as the amount of packet loss the VoIP connection suffers/(estimated or measured) and switch to a new mode based on the degree or amount of packet loss. For example, at a relative low packet loss amount the mode select logic 56 would likely select selective and/or partial redundancy, but at a at high loss amount the mode select logic 56 would apply full redundancy.

In the example, non-exhaustive embodiment, implementing a particular mode or degree of redundancy may involve a step or operation such as operating upon packet(s) (e.g., removing packet(s) stored in one of the buffers 36 of pool 34 of buffers). To this end, in one non-limiting example embodiment redundancy implementor 54 comprises packet remover 57. In addition, since a change of redundancy mode may involve signaling or otherwise communicating the fact of redundancy mode change to wireless station 30, redundancy implementor 54 includes redundancy signal initiator 58. For the more sophisticated or intelligent implementations, the signaling may also include information relating to the newly selected mode of redundancy.

Of course, radio network node 28 typically comprises other unillustrated functionalities and units. The nature and extent of these other functionalities and units depends on the particular role discharged by radio network node 28. For example, in a WCDMA context the radio network node 28 can serve as one or more of a radio network controller (RNC) node or a radio base station node (RBS, or node-B), for example). Therefore, depending on the role(s) assigned or assumed by radio network node 28, the other functionalities and units can comprise interfaces with one or more core network nodes, interfaces with one or more high level radio network controller nodes, interfaces with one or more peer nodes, diversity handling (e.g. connection combining/splitting functionalities) unit(s), for a few examples. Persons skilled in the design of radio access network nodes for each appropriate radio access technology type will understand the constituency and operation of units necessary for each such node. In view of the fact that transmission across air interface 32 requires radio transceivers in at least one node, for sake of illustration radio network node 28 is shown as comprising radio transceivers 60. Numerous radio transceivers 60 can be provided for a particular radio network node 28, some of the radio transceivers 60 being for downlink transmission, others of the radio transceivers 60 being for uplink reception, with the radio transceivers 60 operating on different frequencies for different or same cells.

The wireless station 30 of FIG. 1 comprises one or more transceivers 70 for transmitting/receiving across air interface 32 with, e.g., radio network node 28 or a comparable radio network node. Packets received over air interface 32 are stored in reception (receive) buffer 72; packets prepared for transmission from wireless station 30 over air interface 32 are stored in send or transmission buffer 74. Storage and processing of packets in both receive buffer 72 and transmission buffer 74 is managed by buffer controller 76. The buffer controller 76 can operate in conjunction with a protocol stack handler 78. The protocol stack handler 78, which represents several potential protocols, can (for one or more such protocols) perform the functions of packet handler 82 and signal handler 84 for the downlink from radio network node 28; and the functions of packet generator 86 and signal generator 88 for the uplink. The wireless station 30 further has one or more processors which can encompass and/or execute not only functionality such as that of buffer controller 76 and protocol stack handler 80, but also one or more application programs 90.

In addition, wireless station 30 comprises redundancy controller 92. The redundancy controller 92 comprises redundancy decision logic 94 (having a threshold memory 95), and redundancy implementor 96 (having a signal initiator 97). In some embodiments and scenarios described herein, redundancy decision logic 94 may be unnecessary if radio network node 28 is instead provided with redundancy switch/trigger logic 52. In other embodiments and scenarios described herein, redundancy decision logic 94 of wireless station 30 determines whether adaptive redundancy is to be implemented, and upon making such determination authorizes redundancy implementor 96 to initiate execution of the appropriate redundancy. Differing embodiments of networks and differing scenarios of operation are below discussed.

Scenario S1: Network-Initiated Adaptive Redundancy

Figure 2:
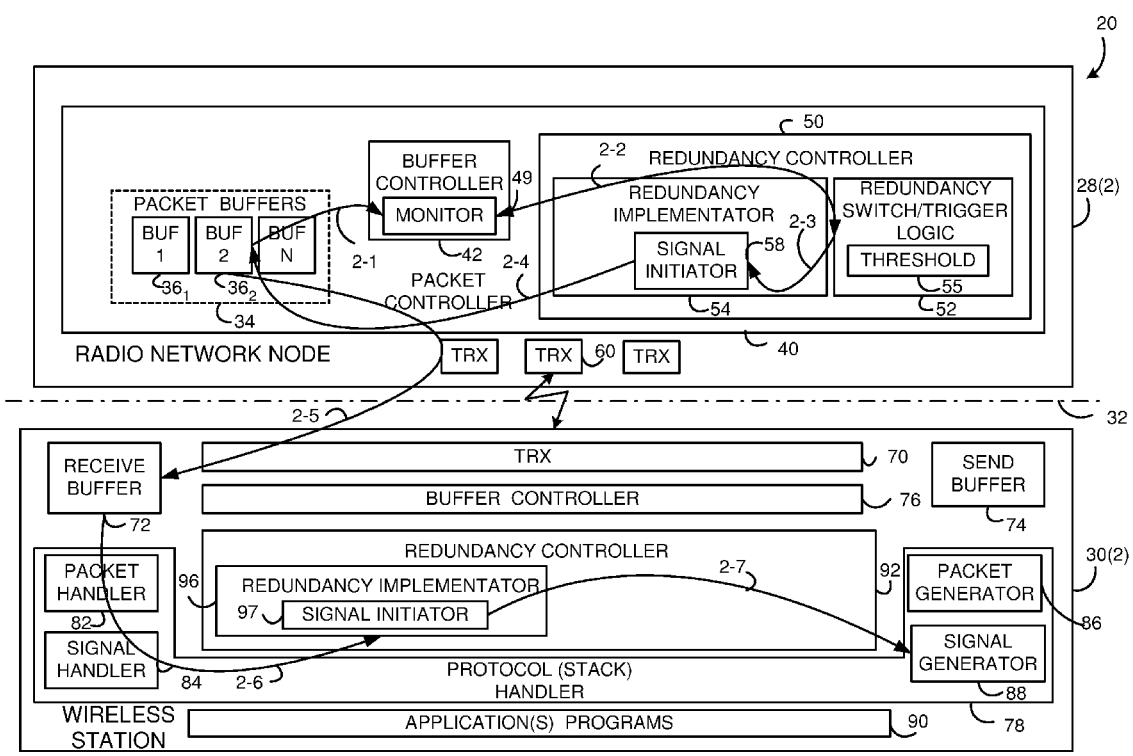
FIG. 2 is a schematic view of a portion of an example communications network having adaptive redundancy according to a first scenario.
Figure 3:
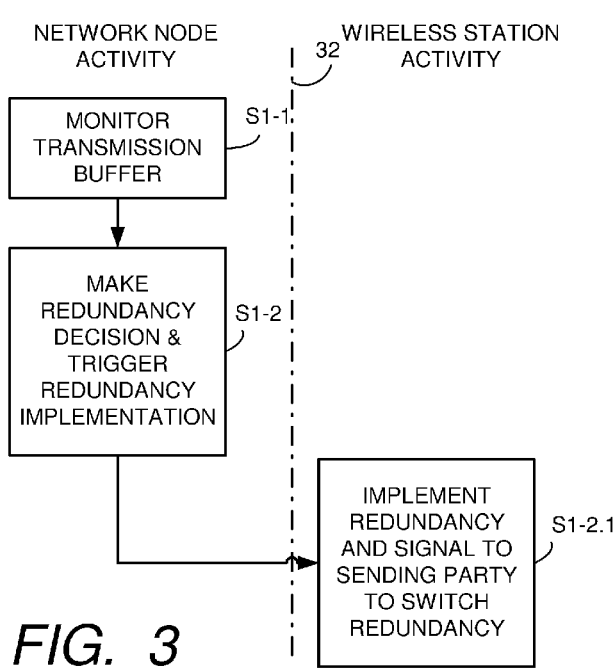
FIG. 3 is a flow chart illustrating example, basic, representative, non-limiting steps or events of the first scenario of adaptive redundancy.

FIG. 2 illustrates an example embodiment wherein radio network node 28(2) resembles radio network node 28 of FIG. 1, and wireless station 30(2) resembles wireless station 30 of FIG. 1 with the exception that wireless station 30(2) does not require redundancy decision logic 94. Example, representative, non-limiting steps or events of operation of the embodiment of FIG. 2 are described with reference to a first scenario (S1) and illustrated in FIG. 3. In the first scenario (S1), a network-initiated implementation initiated on downlink activity monitors a transmission buffer 36$_2$ of a radio access network (RAN) node, e.g., radio network node 28(2) which can be, for example, a Node-B. The general steps of this first scenario are as follows:

Step S1-1: The network monitors a transmission buffer being used or allocated for a connection, the transmission buffer 36 being one of the buffers in pool 34 of buffers. For example, buffer monitor 49 can monitor a fill level or the like for the transmission buffer 36$_2$, as also depicted by arrow 2-1 in FIG. 2.

Step S1-2.1: When the monitored transmission buffer is filled to a given threshold, a redundancy implementation event is triggered in the radio access network (RAN). For example, as depicted by arrow 2-2 in FIG. 2, redundancy switch/trigger logic 52 of redundancy controller 50 can check or be apprised of the fill level or other occupancy-related parameter obtained or maintained by buffer monitor 49, and compare such level or parameter to a threshold value or other criteria stored in threshold memory 55. The redundancy switch/trigger logic 52 thus uses the threshold is value (or other stored criteria) to make a determination or decision regarding a redundancy mode change, and (as represented by arrow 2-3 in FIG. 2) so notifies redundancy implementor 54.

The redundancy implementation event so triggered can be, for example, changing a portion of the packet in the transmission buffer 36$_2$ in order to indicate to the receiving mobile (e.g., wireless station 30) that it in turn should signal to the sending mobile (the second party or client to the packet connection) to change its redundancy mode. To this end, redundancy signal initiator 58 of redundancy implementor 54 may be responsible for directing buffer controller 42 to change the content of the packet in a way to indicate the mode of adaptive redundancy desired as a result of the redundancy switch determination of step S1-2.1. The content of the packet changed by step S1-2.1 can be, for example, the CMR (Change Mode Request) bits of the RTP packets. Arrow 2-4 of FIG. 2 depicts the changing of the content of the packet stored in buffer 36$_2$ to indicate a change in adaptive redundancy mode.

Step S1-2.2: The receiving wireless station 30, upon reception (depicted by arrow 2-5) of the packets with content altered to reflect implementation of adaptive redundancy (e.g., altered CMR bits), signals to the sending party of the connection (e.g., another wireless station or a wired station which serves as the sending party) to switch the redundancy coding mode. For example, if the decision were made at step S1-2.1 to switch on the redundancy coding, at step S1-2.2 the wireless station 30 signals the sending wireless station also to switch on the redundancy coding. In this regard, the signal handler 84 of wireless station 30 can detect that a received packet has been altered so as to reflect the new mode of redundancy, and apprise redundancy controller 92 accordingly as shown by arrow 2-6. The redundancy controller 92, through its redundancy implementor 96 and particularly its signal initiator 97, includes (as shown by arrow 2-7) an appropriate indicator in out-going packets to the sending party that the redundancy mode has switched. Henceforth (until switched back) outgoing packets from wireless station 30 will contain the redundancy switch-indicative signal.

Such signaling to the sending party can be performed in various, such as one or more (e.g., in combination) of the following:

Step S1-2.2.1 The receiving wireless station 30 can switch on/off redundancy coding itself, and thereby indicate the redundancy mode to the sending party. In this regard, upon detecting the redundancy signal in packets it receives, redundancy implementor 96 of wireless station 30 can begin implementation of redundancy for packets generated by 86 and stored in transmission buffer 74.

Step S1-2.2.2 The receiving wireless station 30 can set an appropriate indicator in the contents of packets it sends to the sending party to indicate the mode of redundancy. For example, the signal initiator 97 of wireless station 30 can set the CMR bits of its RTP packets to indicate that redundancy coding shall be switched on/off.

Step S1-2.2.3 The wireless station 30 can use session initiation protocol (SIP) protocol, e.g. by means of the SIP update method, to change the settings of the session to use/not use redundancy coding.

Steps S1-1 and S1-2 can be repeated as necessary.

Thus, in one of its aspects the technology concerns a method of operating a telecommunications network comprising steps of monitoring an indicator for a flow of packets in a connection (session) for determining a need for redundancy of at least some packet content for the packets; and, adaptively implementing the redundancy in accordance with the monitoring. The indicator can be obtained from a buffer wherein the packets of the flow are at least temporarily stored, and wherein the monitoring of the indicator comprises comparing the indicator to a threshold. As illustrated in example fashion by the embodiment of FIG. 2 and the first scenario (S1), the buffer can be a transmission buffer of a network node, and the indicator is related to a number of packets resident in the transmission buffer. For example, the buffer can be a medium access control (MAC) high speed buffer of the network node.

Figure 5:
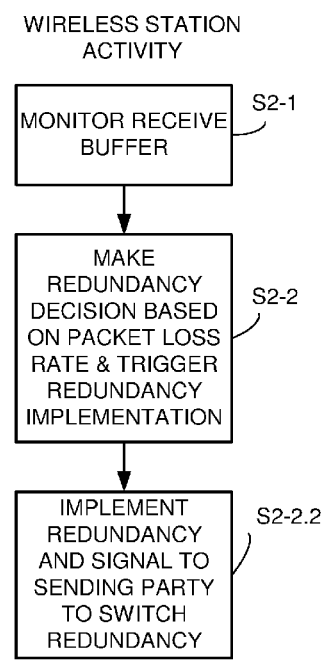
FIG. 5 is a flow chart illustrating example, basic, representative, non-limiting steps or events of the second scenario of adaptive redundancy.
Figure 4:
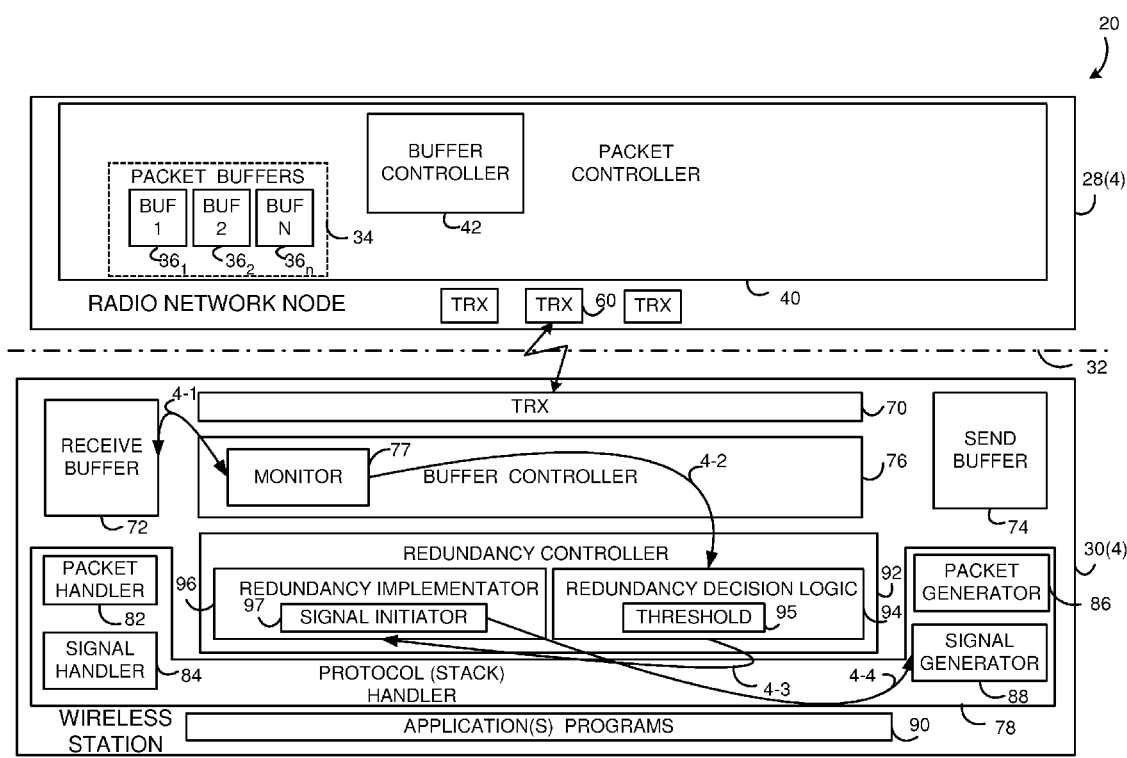
FIG. 4 is a schematic view of a portion of an example communications network having adaptive redundancy according to a second scenario.

Scenario S2: Mobile-Initiated Adaptive Redundancy: Downlink-Activated:Monitoring Receiver Buffer FIG. 4 illustrates an embodiment wherein adaptive redundancy is mobile-initiated on downlink activity, e.g., is initiated by wireless station 30 rather than at a network node; and thus an embodiment conducive to a second scenario (S2) having example, representative, non-limiting steps or events of operation illustrated as in FIG. 5. The radio network node 28(4) of FIG. 4 resembles radio network node 28 of FIG. 1, except that redundancy controller 50 is unnecessary. Wireless station 30(4) resembles wireless station 30 of FIG. 1, but in addition has a buffer monitor 77 (as part, e.g., of its buffer controller 76). In the second scenario (S2), a mobile-initiated implementation initiated on downlink activity monitors a receiver buffer (e.g., receive buffer 72) of wireless station 30 for, e.g., lost packets. The general steps of this second scenario are as follows:

Step S2-1: The wireless station 30 monitors its receiving buffer 72 for, e.g., lost packets. In this regard, buffer monitor 77 periodically or otherwise checks the packets received in receive buffer 72 for lost packets, as indicated by arrow 4-1 of FIG. 4.

Step S2-2: When the receiving wireless station 30, by examining the received packet buffer 72 or packets therein, discovers that the packet loss rate reaches and/or exceeds a given threshold trigger, a redundancy implementation event is triggered by the wireless station 30. In the example embodiment of FIG. 4, redundancy decision logic 94 of redundancy controller 92 can check or be apprised of packet loss amount or other packet-related parameter obtained or maintained by buffer monitor 77 (as indicated by arrow 4-2), and compare such number or parameter to a threshold value or other criteria stored in threshold memory 95. The redundancy decision logic 94 thus uses the threshold value (or other stored criteria) to make a determination or decision regarding a redundancy mode change, and (as represented by arrow 4-3 in FIG. 4) so notifies redundancy implementor 96. The redundancy implementor 96 in turns performs a redundancy implementation event. The redundancy implementation event so triggered can be, for example, step S2-2.2.

Step S2-2.2: The receiving wireless station 30 signals to a sending party to switch (either on/off) the redundancy coding, as represented by arrow 4-4 of FIG. 4. Such signaling to the sending party can be performed in various ways, such as one or more (e.g., in combination) of the following:

Step S2-2.2.1 The receiving wireless station 30 can switch on/off redundancy coding itself, and thereby indicate the redundancy mode to the sending party. In this regard, redundancy implementor 96 of wireless station 30 can begin implementation of redundancy for packets generated by 86 and stored in transmission buffer 74.

Step S2-2.2.2 The receiving wireless station 30 can set an appropriate indicator in the contents of packets it sends to the sending party to indicate the mode of redundancy. For example, the signal initiator 97 of wireless station 30 can set the CMR bits of its RTP packets to indicate that redundancy coding shall be switched on/off.

Step S2-2.2.3 The wireless station 30 can use session initiation protocol (SIP) protocol, e.g. by means of the SIP update method, to change the settings of the session to use/not use redundancy coding.

The steps S2-1 and S2-2 can be repeated as necessary.

Thus, in one of its aspects the technology concerns a method of operating a telecommunications network comprising steps of monitoring an indicator for a flow of packets in a connection (session) for determining a need for redundancy of at least some packet content for the packets; and, adaptively implementing the redundancy in accordance with the monitoring. The indicator can be obtained from a buffer wherein the packets of the flow are at least temporarily stored, and wherein the monitoring of the indicator comprises comparing the indicator to a threshold. As illustrated in example fashion by the embodiment of FIG. 4 and the second scenario (S2), the buffer can be a reception buffer of a wireless station (mobile), and the indicator is related to a number of packets lost or missing from the reception buffer.

Figure 6:
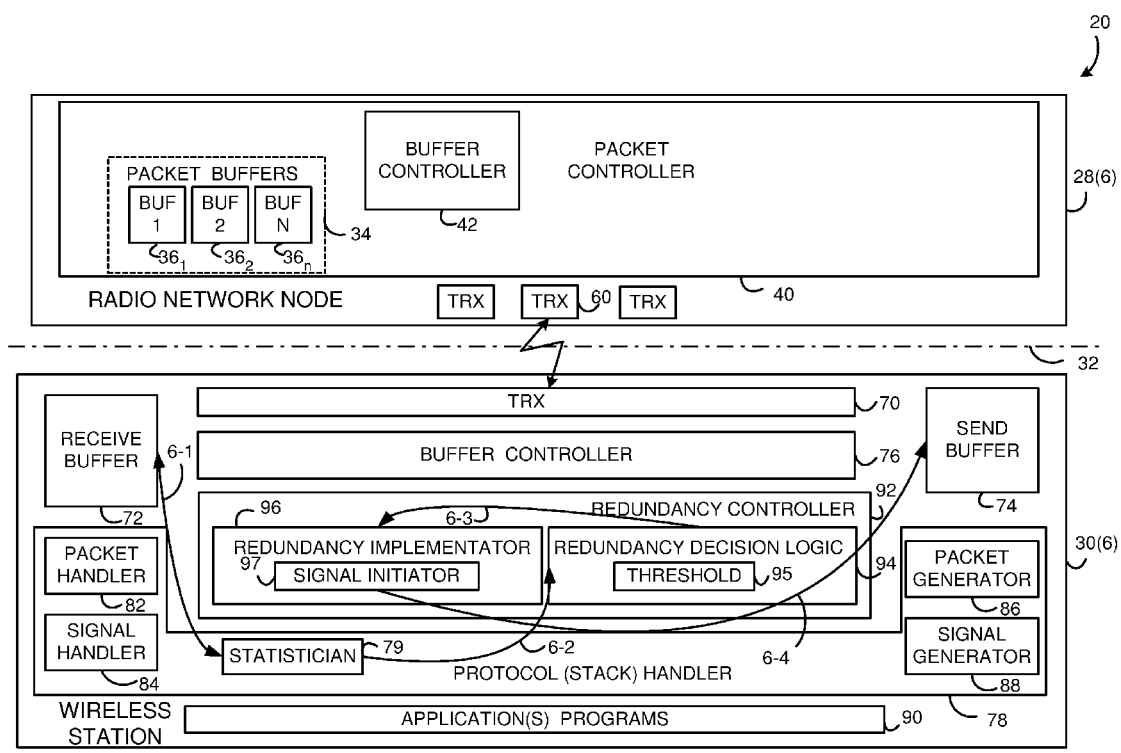
FIG. 6 is a schematic view of a portion of an example communications network having adaptive redundancy according to a third scenario.

Scenario S3: Mobile-Initiated Adaptive Redundancy: Downlink-Activated:Monitoring Statistics FIG. 6 illustrates another embodiment wherein adaptive redundancy is mobile-initiated on downlink activity, e.g., is initiated by wireless station 30 rather than at a network node; and thus an embodiment conducive to a third scenario (S3) having example, representative, non-limiting steps or events of operation illustrated as in FIG. 7. The radio network node 28(6) of FIG. 6 resembles radio network node 28(4) of FIG. 4; wireless station 30(4) resembles wireless station 30(4) of FIG. 4, but preferably has a protocol statistician 79 rather than a buffer monitor 77. In the third scenario (S3), a mobile-initiated implementation initiated on downlink activity monitors sender and/or is receiver statistics.

Figure 21:
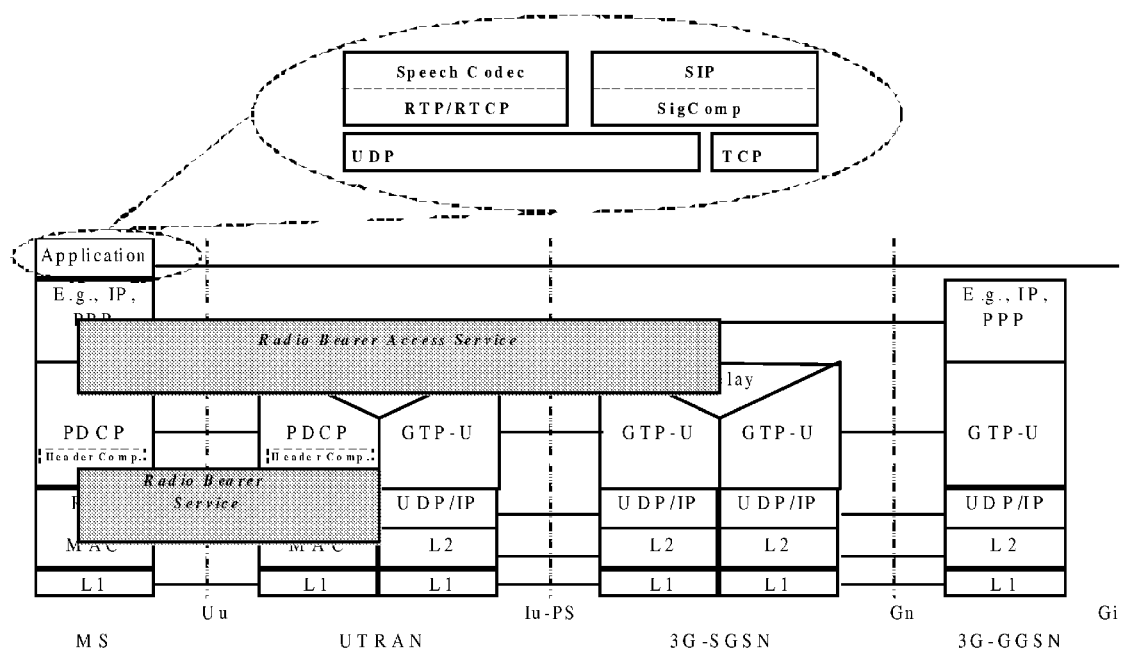
FIG. 21 is a diagrammatic view of an example packet switched protocol structure for handling VoIP in an example wireless station.

For a mobile integrated application, the protocol statistician 79 can be part of the protocol stack handler 78. For an off the shelf voip application, which includes a software codec (not a hardware supported speech codec), the RTP/RTCP protocol can be part of the application(s)/program (not only for this scenario but also for the receive buffer etc.). In fact, the example embodiments illustrated herein do not exclude a different realization wherein (as illustrated by way of example in FIG. 21) the application layer includes a receive buffer (e.g. a RTP or codec buffer), a sender buffer (e.g. a RTP or codec buffer), parts of the protocol handler (e.g. RTP/RTPC) including the protocol statistician 79, signal handler, signal and packet generator, and redundancy controller.

The general steps of this third scenario are as follows:

Step S3-1: The protocol statistician 79 of wireless station 30 keeps tracks of sender and/or receiver statistics included in, for example, RTCP reports, as illustrated by arrow 6-1. The redundancy decision logic 94 of wireless station 30 monitors the sender and/or receiver statistics as maintained by protocol statistician 79 (as represented by arrow 6-2).

Step S3-2: The sender and/or receiver reports give feedback to redundancy decision logic 94, such feedback including, e.g., that the number of packet/data bytes lost has reached and/or exceeded a given threshold (e.g., a threshold value or criteria stored in threshold memory 95). When the threshold value is exceeded or criteria is fulfilled, redundancy decision logic 94 prompts redundancy implementor 96 to trigger a redundancy implementation event, as reflected by arrow 6-3 in FIG. 6. The redundancy implementation event of steps S3-2 so triggered can be, for example, step S3-2.1.

Step S3-2.1 The receiving wireless station 30 can switching on/off redundancy coding itself, and thereby signal or indicate (as reflected by arrow 6-4) the redundancy mode to the sending party. In this regard, redundancy implementor 96 of wireless station 30 can begin implementation of redundancy for packets generated by 86 and stored in transmission buffer 74.

The steps S3-1 and S3-2 can be repeated as necessary.

Thus, in one of its aspects the technology concerns a method of operating a telecommunications network comprising steps of monitoring an indicator for a flow of packets in a connection (session) for determining a need for redundancy of at least some packet content for the packets; and, adaptively implementing the redundancy in accordance with the monitoring. As illustrated in example fashion by the embodiment of FIG. 6 and the third scenario (S3), the monitoring can be performed by wireless station 30 and can related to receiver/sender statistics.

Scenario S4: Mobile-Initiated Adaptive Redundancy: Downlink-Activated:Monitoring Buffer Jitter/Delay In another embodiment adaptive redundancy is also mobile-initiated on downlink activity, but the downlink activity involves monitoring a receiver buffer of the mobile for, e.g., packet jitter/delay. The radio network node this further embodiment resembles radio network node 28(2) of FIG. 4, and the wireless station of this embodiment resembles the wireless station 30(4) of FIG. 4 except that buffer monitor 77 (as part, e.g., of its buffer controller 76) monitors for packet jitter/delay. This further embodiment conducive to a fourth scenario (S4) having example, representative, non-limiting steps or events of operation illustrated as in FIG. 8. The general steps of this fourth scenario are as follows:

Step S4-1: The wireless station 30 monitors its receiving buffer 72 for, e.g., jitter and/or delay. In this regard, buffer monitor 77 periodically or otherwise checks the buffer 72 for jitter/delay, as indicated by arrow 4-1 of FIG. 4.

Step S4-2: When the receiving wireless station 30, by examining the receive packet buffer 72 or packets therein, discovers that the jitter or delay reaches and/or exceeds a given threshold trigger, a redundancy implementation event is triggered by the wireless station 30. In the example embodiment of the fourth scenario (S4), redundancy decision logic 94 of redundancy controller 92 can check or be apprised of the degree of jitter or delay (as indicated by arrow 4-2), and compare such number or parameter to a threshold value or other criteria stored in threshold memory 95. The redundancy decision logic 94 thus uses the threshold value (or other stored criteria) is to make a determination or decision regarding a redundancy mode change, and (as represented by arrow 4-3 in FIG. 4) so notifies redundancy implementor 96. The redundancy implementor 96 in turns performs a redundancy implementation event. The redundancy implementation event so triggered can be, for example, step S4-2.1.

Step 4-2.1: The receiving wireless station 30 signals to a sending party to switch (either on/off) the redundancy coding, as represented by arrow 4-4 of FIG. 4. Such signaling to the sending party can be performed in various ways, such as one or more (e.g., in combination) of the following:

Step S4-2.2.1 The receiving wireless station 30 can switching on/off redundancy coding itself, and thereby indicate the redundancy mode to the sending party. In this regard, redundancy implementor 96 of wireless station 30 can begin implementation of redundancy for packets generated by 86 and stored in transmission buffer 74.

Step S4-2.2.2 The receiving wireless station 30 can set an appropriate indicator in the contents of packets it sends to the sending party to indicate the mode of redundancy. For example, the signal initiator 97 of wireless station 30 can set the CMR bits of its RTP packets to indicate that redundancy coding shall be switched on/off.

Step S4-2.2.3 The wireless station 30 can use session initiation protocol (SIP) protocol, e.g. by means of the SIP update method, to change the settings of the session to use/not use redundancy coding.

Steps S4-1 and S4-2 can be repeated as necessary.

Thus, in one of its aspects the technology concerns a method of operating a telecommunications network comprising steps of monitoring an indicator for a flow of packets in a connection (session) for determining a need for redundancy of at least some packet content for the packets; and, adaptively implementing the redundancy in accordance with the monitoring. The indicator can be obtained from a buffer wherein the packets of the flow are at least temporarily stored, and wherein the monitoring of the indicator comprises comparing the indicator to a threshold. As illustrated in example fashion by the embodiment of FIG. 4 and the second scenario (S2), the buffer can be a reception buffer of a wireless station (mobile), and the indicator is related to a is packet jitter and/or delay in the reception buffer of the wireless station 30.

Figure 9:
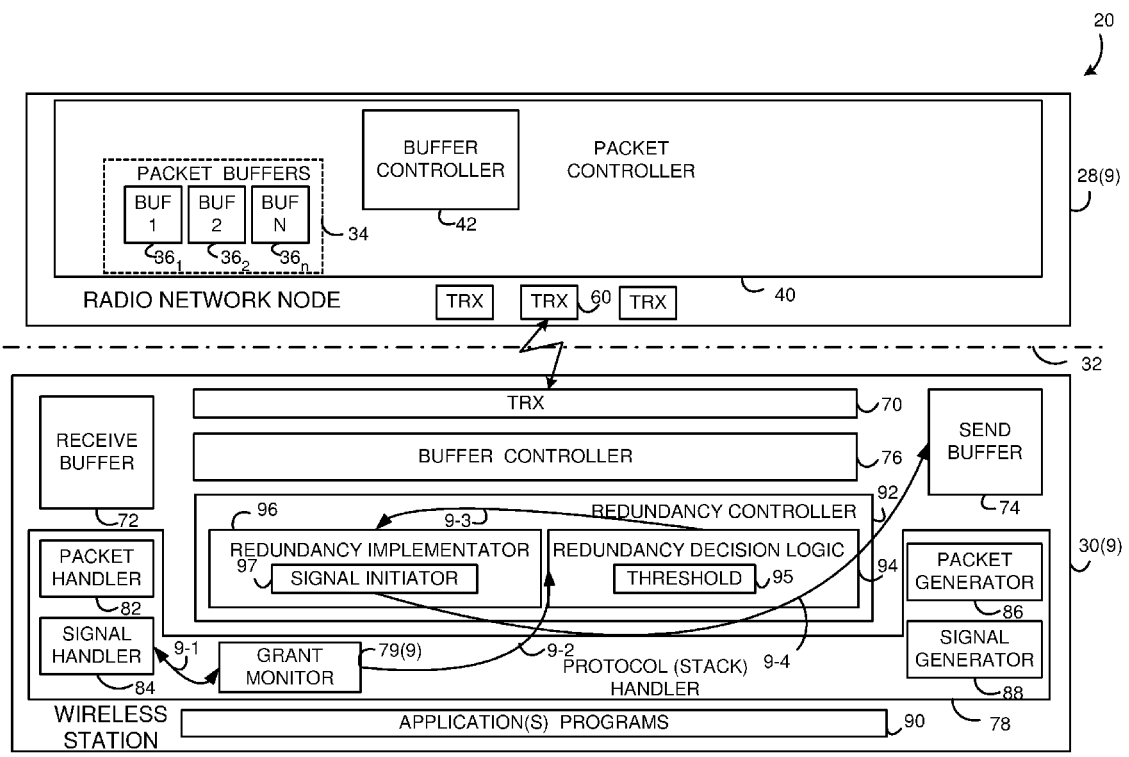
FIG. 9 is a schematic view of a portion of an example communications network having adaptive redundancy according to a fifth scenario.

Scenario S5: Mobile-Initiated Adaptive Redundancy: Uplink-Activated:Monitoring Uplink Grants FIG. 9 illustrates another embodiment wherein adaptive redundancy is mobile-initiated on downlink activity, e.g., is initiated by wireless station 30 rather than at a network node; and thus an embodiment conducive to a fifth scenario (S5) having example, representative, non-limiting steps or events of operation illustrated as in FIG. 10. The radio network node 28(9) of FIG. 6 resembles radio network node 28(4) of FIG. 4; wireless station 30(6) resembles wireless station 30(4) of FIG. 4, but preferably has a grant analyzer or monitor 79(9) (as part, e.g., of its protocol stack handler 78, e.g., a MAC-e entity).

In the fifth scenario (S5), a mobile-initiated implementation initiated on downlink activity monitors uplink grants. The uplink grants are generated by a MAC-e entity located in the Node B. The grant is sent as a response to a request from wireless station 30 to transmit on the E-DCH (enhanced uplink channel). Absolute grants are used to set an absolute value of the serving grant. The serving grant is expressed as a limit of a power ratio between the data channel and control channel. The relative grant tells wireless station 30 to increase or hold or decrease the power ratio with one step from the previous used power ratio. The grants are thus a power ratio. The wireless station 30 typically transforms this ratio to an appropriate data rate at which it should transmit. In general higher power ratio gives higher data rate.

The general steps of this fifth scenario are as follows:

Step S5-1: The grant monitor 79(9) of wireless station 30 keeps tracks of uplink grant(s) received from radio network node 28 (both absolute and relative) as illustrated by arrow 9-1. The redundancy decision logic 94 of wireless station 30 monitors the uplink grant(s) as maintained by grant monitor 79(9) (as represented by arrow 9-2).

Step S5-2: When information obtained or derived from the uplink grant(s) reaches and/or exceeded a given threshold (e.g., a threshold value or criteria stored in threshold memory 95), redundancy decision logic 94 prompts redundancy implementer is 96 to trigger a redundancy implementation event, as reflected by arrow 9-3 in FIG. 9. For example, when the absolute grants gives a lower sender rate than a given threshold and/or the relative grants are continuously bringing the sender rate downwards for a given threshold number of relative grants, a redundancy implementation event is triggered by redundancy decision logic 94 of wireless station 30. The redundancy implementation event of steps S5-2 so triggered can be, for example, step S5-2.1

Step S5-2.1 The receiving wireless station 30 can switching on/off redundancy coding itself, and thereby signal or indicate (as reflected by arrow 9-4) the redundancy mode to the sending party. In this regard, redundancy implementer 96 of wireless station 30 can begin implementation of redundancy for packets generated by packet generator 86 and stored in transmission buffer 74. In this case it is primarily the wireless station which receives the grants and which should switch on redundancy coding, i.e. for the uplink. However, if both end-points (mobiles) reside in the same network, it is also beneficial to indicate to the other endpoint to switch on redundancy coding. Such indication to the other endpoint can be implemented either by altering the CMR bits of the RTP packets or by SIP signaling.

Steps S5-1 and S5-2 can be repeated as necessary.

As the redundancy coding may not result in a lower user date rate, it may, in this scenario, be better to switch down the codec rate. Or a perhaps even a combination of switching down the codec rate and applying the redundancy coding, but in such away that the resulting user data rate is still lower.

Figure 11:
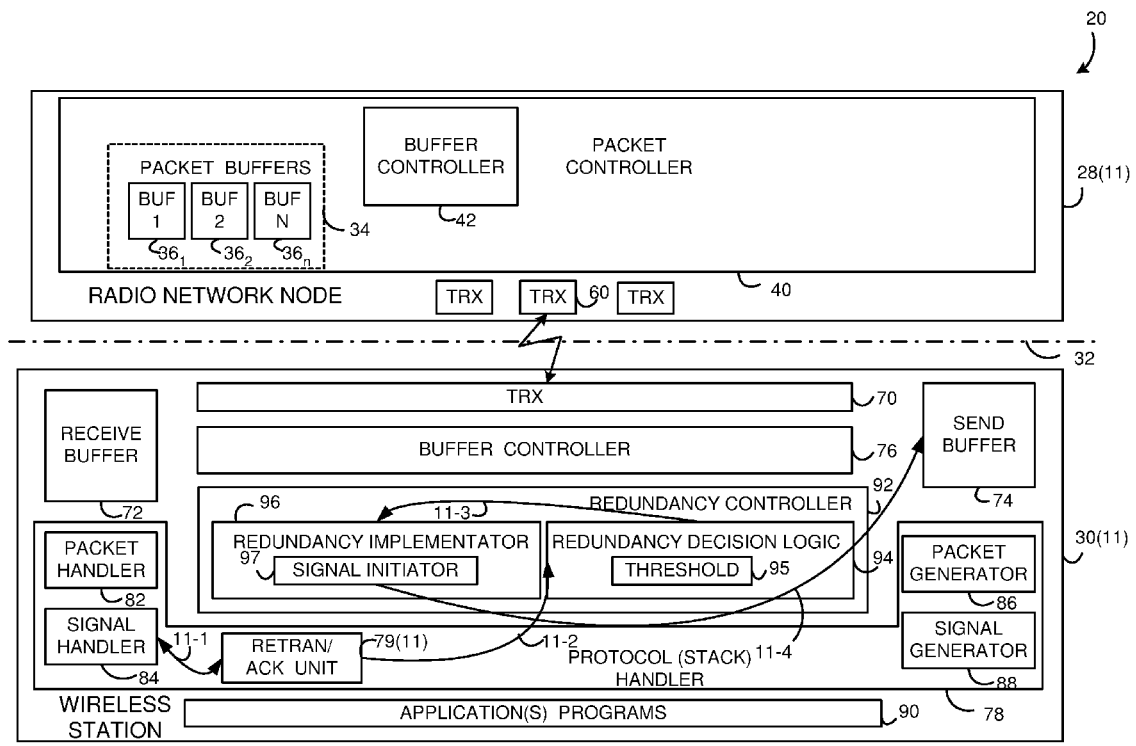
FIG. 11 is a schematic view of a portion of an example communications network having adaptive redundancy according to a sixth scenario.
Figures 12, 14:
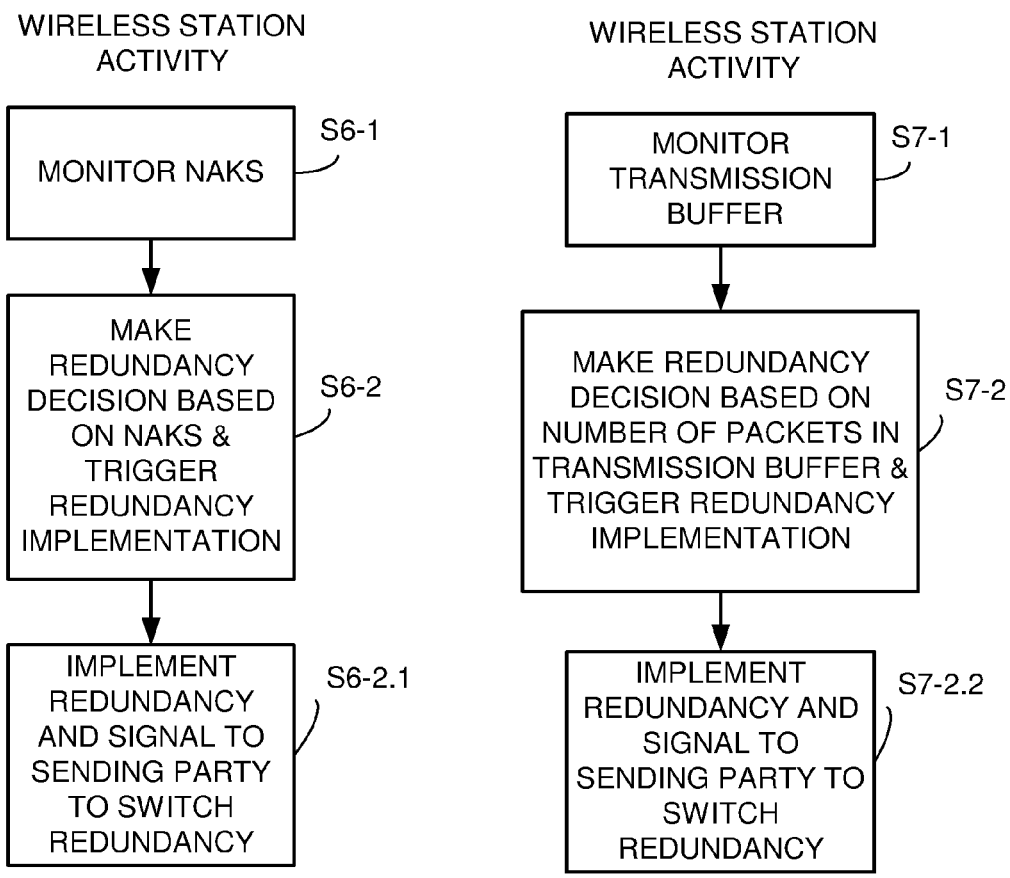
FIG. 12 is a flow chart illustrating example, basic, representative, non-limiting steps or events of the sixth scenario of adaptive redundancy.
FIG. 14 is a flow chart illustrating example, basic, representative, non-limiting steps or events of the seventh scenario of adaptive redundancy.

Scenario S6:Mobile-Initiated Adaptive Redundancy: Uplink-Activated:Monitoring Uplink NAKS FIG. 11 illustrates another embodiment wherein adaptive redundancy is mobile-initiated on downlink activity, e.g., is initiated by wireless station 30 rather than at a network node; and thus an embodiment conducive to a sixth scenario (S6) having example, representative, non-limiting steps or events of operation illustrated as in FIG. 12. The radio network node 28(11) of FIG. 6 resembles radio network node 28(4) of FIG. 4; wireless station 30(11) resembles wireless station 30(4) of FIG. 4, but preferably has a retransmission/acknowledgement unit 79(11) (as part, e.g., of its protocol stack is handler 78). In the sixth scenario (S6), a mobile-initiated implementation initiated on uplink activity monitors enhanced uplink negative acknowledgements (NAKs). The general steps of this sixth scenario are as follows:

Step S6-1: When an uplink transmission is unsuccessful, a negative acknowledgement (NAK) is received from radio network node 28 and registered by retransmission/acknowledgement unit 79(11) (as represented by arrow 11-1). The redundancy decision logic 94 of wireless station 30 monitors the number of uplink negative acknowledgements (NAKs) received by retransmission/acknowledgement unit 79(11) (as represented by arrow 11-2).

Step S6-2: When the number of uplink negative acknowledgements (NAKs) received by retransmission/acknowledgement unit 79(11) reaches and/or exceeds a given threshold (e.g., a threshold value or criteria stored in threshold memory 95), redundancy decision logic 94 prompts redundancy implementer 96 to trigger a redundancy implementation event, as reflected by arrow 11-3 in FIG. 11. The redundancy implementation event of step S6-2 so triggered can be, for example, step S6-2.1

Step S6-2.1 The receiving wireless station 30 can switch on/off redundancy coding itself, and thereby signal or indicate (as reflected by arrow 11-4) the redundancy mode to the sending party. In this regard, redundancy implementer 96 of wireless station 30 can begin implementation of redundancy for packets generated by packet generator 86 and stored in transmission buffer 74. In this case it is primarily the wireless station which receives the negative acknowledgements (NAKs) and which should switch on redundancy coding, i.e. for the uplink. However, if both end-points (mobiles) reside in the same network, it is also beneficial to indicate to the other endpoint to switch on redundancy coding. As mentioned before, such indication to the other endpoint can be implemented either by altering the CMR bits of the RTP packets or by SIP signaling.

Steps S6-1 and S6-2 can be repeated as necessary.

As in the preceding scenario, since the redundancy coding may not result in a lower user date rate, it may, in this scenario also, be better to switch down the codec rate. Or a perhaps even a combination of switching down the codec rate and applying the redundancy coding, but in such away that the resulting user data rate is still lower.

Figure 13:
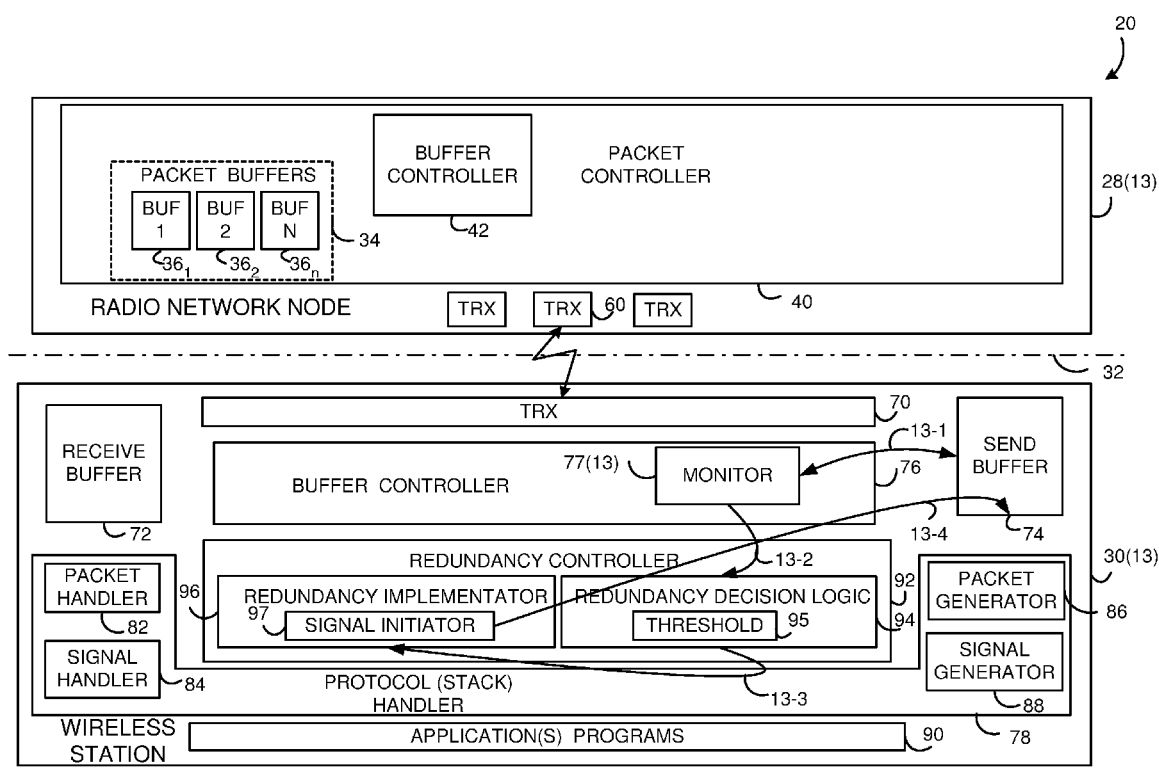
FIG. 13 is a schematic view of a portion of an example communications network having adaptive redundancy according to a seventh scenario.

Scenario S7:Mobile-Initiated Adaptive Redundancy: Uplink-Activated:Monitoring Transmission Buffer FIG. 13 illustrates an embodiment wherein adaptive redundancy is mobile-initiated on downlink activity, e.g., is initiated by wireless station 30 rather than at a network node; and thus an embodiment conducive to a seventh scenario (S7) having example, representative, non-limiting steps or events of operation illustrated as in FIG. 14. The radio network node 28(13) of FIG. 13 resembles radio network node 28(4) of FIG. 4, wireless station 30(13) resembles wireless station 30(4) of FIG. 4 but has a transmission buffer monitor 77(13) (as part, e.g., of its buffer controller 76) rather than a reception buffer monitor. In the seventh scenario (S7), a mobile-initiated implementation initiated on uplink activity monitors a transmitter buffer (e.g., send buffer 74) of wireless station 30(13). The general steps of this seventh scenario are as follows:

Step S7-1: The wireless station 30 monitors its send buffer 74 for, e.g., determining a number of packets in transmission buffer 74 which are awaiting transmission over air interface 32 to radio network node 28, as indicated by arrow 13-1 of FIG. 13.

In this regard, buffer monitor 77(13) periodically or otherwise checks the number of packets stored in transmission buffer 74, as indicated by arrow 13-1 of FIG. 13.

Step S7-2: Redundancy decision logic 94 periodically or otherwise checks or is advised by buffer monitor 77(13) regarding the number of packets in transmission buffer 74 awaiting transmission, as indicated by arrow 31-2 in FIG. 13. When the number of packets in transmission buffer 74 awaiting transmission reaches and/or exceeds a given threshold (e.g., a threshold value or criteria stored in threshold memory 95), redundancy decision logic 94 prompts redundancy implementer 96 to trigger a redundancy implementation event, as reflected by arrow 13-3 in FIG. 13. The redundancy implementation event of step S7-2 so triggered can be, for example, step S7-2.1

Step S7-2.1 The receiving wireless station 30 can switch on/off redundancy coding itself, and thereby signal or indicate (as reflected by arrow 13-4) the redundancy mode to the sending party. In this regard, redundancy implementor 96 of wireless station 30 can begin implementation of redundancy for packets generated by packet generator 86 and stored in transmission buffer 74. In this case it is primarily the wireless station which transmission buffer has reached or exceeded a given threshold and which should switch on redundancy coding, i.e. for the uplink. However, if both end-points (mobiles) reside in the same network, it is also beneficial to indicate to the other endpoint to switch on redundancy coding. As mentioned before, such indication to the other endpoint can be implemented either by altering the CMR bits of the RTP packets or by SIP signaling.

Steps S7-1 and S7-2 can be repeated as necessary.

As in the two preceding scenarios, since the redundancy coding may not result in a lower user date rate, it may, in this scenario also, be better to switch down the codec rate. Or a perhaps even a combination of switching down the codec rate and applying the redundancy coding, but in such away that the resulting user data rate is still lower.

Figure 15:
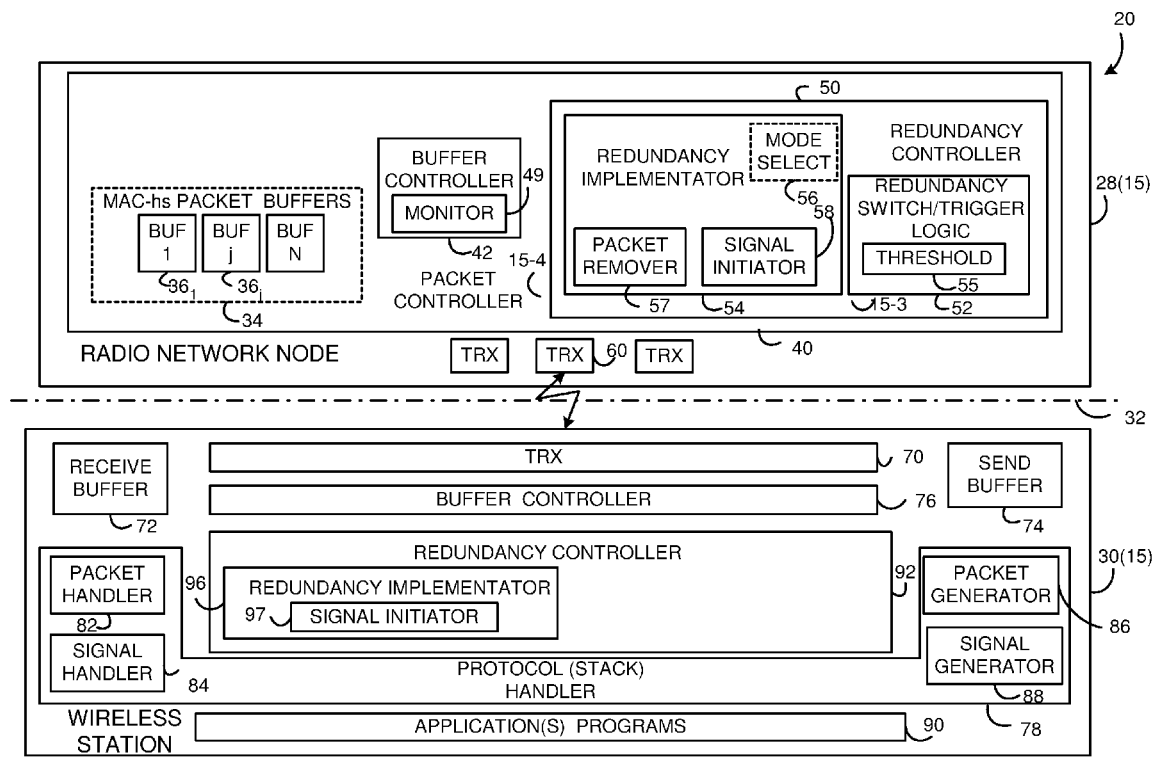
FIG. 15 is a schematic view of a portion of an example communications network having adaptive redundancy according to an eighth scenario.

Scenario S8:Network-Initiated Adaptive Redundancy: Downlink-Activated:MAC-HS Delay Scheduling Transmission Buffer An eighth scenario (S8) is a more specific variation of the first scenario. FIG. 15 illustrates a radio network node 28(15) and a wireless station 30(15) for the eight scenario, which respectively resemble radio network node 28(2) and wireless station 30(2) of FIG. 2. However, in the radio network node 28(15) for the eight scenario the redundancy implementor 54 of packet controller 40 includes a packet remover 57 in like manner as FIG. 1. Moreover, for the eight scenario, the buffers 36 in pool 34 are medium access control (MAC) High Speed Downlink Packet Access (HSDPA) buffers (e.g., MAC-hs buffers). See, e.g., 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6). FIG. 16A-FIG. 16F, together with FIG. 3 and its foregoing discussion, describe example, representative, non-limiting steps or events of operation of the embodiment of FIG. 15.

In the eight scenario, a delay scheduler for the MAC-hs scheduling algorithm for packet connection j (e.g., packet remover 57) discards packets that have remained in the transmission buffer $36_j$ for a given amount of time, i.e., when the delay for a packet exceeds a given threshold, the packet is dropped. This packet removal will cause an increase in packet loss rate, which may become to large for the receiving party/ client (e.g., wireless station 30) to handle. This will eventually result in decreased voice quality.

FIG. 16A illustrates packets being placed in the MAC-hs transmission buffer $36_j$ from higher layers, as well as packets being sent from the MAC-hs transmission buffer $36_j$. In FIG. 16A, the packet buffer reside delay is increasing per packet, possibly due to high load (making it not possible to schedule more often).

The general steps of this eighth scenario are as follows:

Step S8-A: The network monitors the MAC-hs transmission buffer involved in the connection, e.g., buffer $36_j$ for packet connection j.

Step S8-B: When the MAC-hs transmission buffer is filled to a given threshold, e.g., a pre-discard delay threshold, a redundancy implementation event is triggered in the radio access network (RAN), e.g., in network node 28. FIG. 16B shows the pre-discard delay threshold being reached. The redundancy implementation event can be, for example, that of step S8-B.1.

Step S8-B.1: Packets are dropped/discarded from the transmission buffer in a controlled manner, e.g. in an order to avoid consecutive packet loss. Any method of packet removal can be utilized, it being understood that the packet loss rate due to this controlled dropping must not exceed a given packet loss rate. An example of such controlled packet discard is discard of every other packets. Further, packets judged as redundant coded packets should not be dropped/discarded if other non-redundant coded packets are in the buffer. A number of packet drop schemes can be utilized, as the technology herein is not limited to any particular packet drop scheme. For example other packet drop schemes include a random drop scheme and a drop scheme which concentrates on dropping oldest packets. FIG. 16C shows the drop scheme starting to remove packets (removed packets are depicted by a superimposed X). The example packet drop scheme of FIG. 16C happens to be a random drop scheme. As the drop scheme is implemented, eventually (as illustrated by FIG. 16D) removal of packets return transmission buffer operations back to normal.

Figure 17:
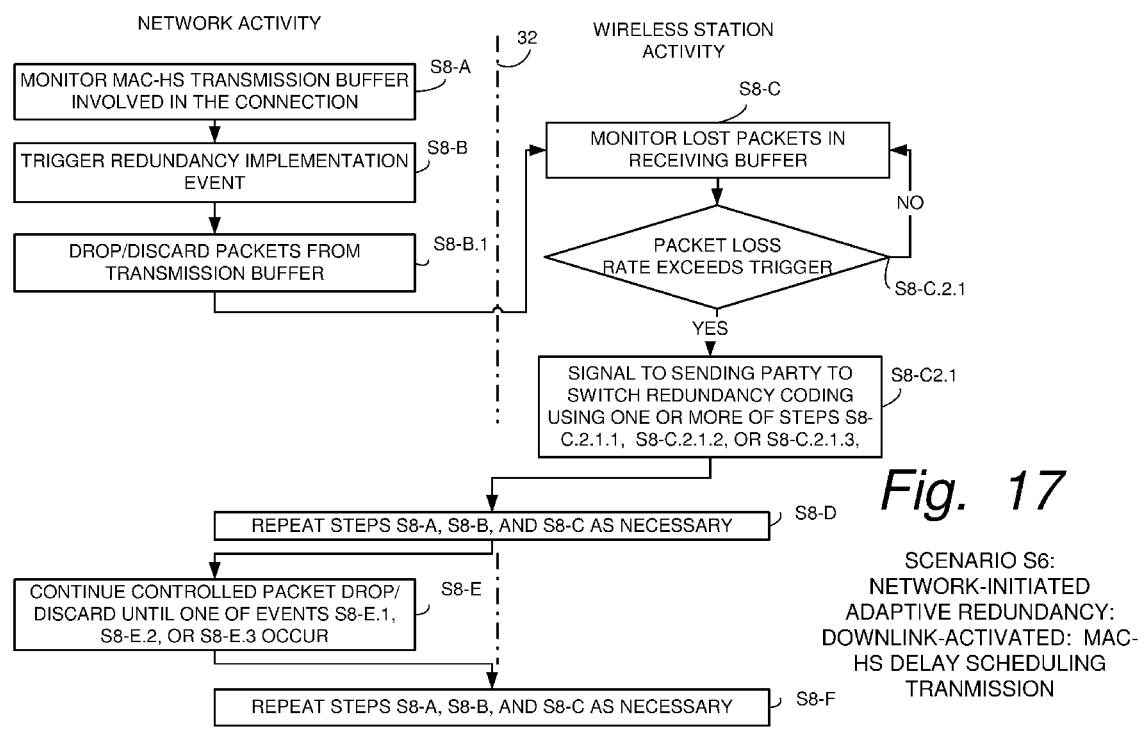
FIG. 17 is a flowchart illustrating example, basic, representative, non-limiting steps or events of the eight scenario of adaptive redundancy.
Figure 17A:
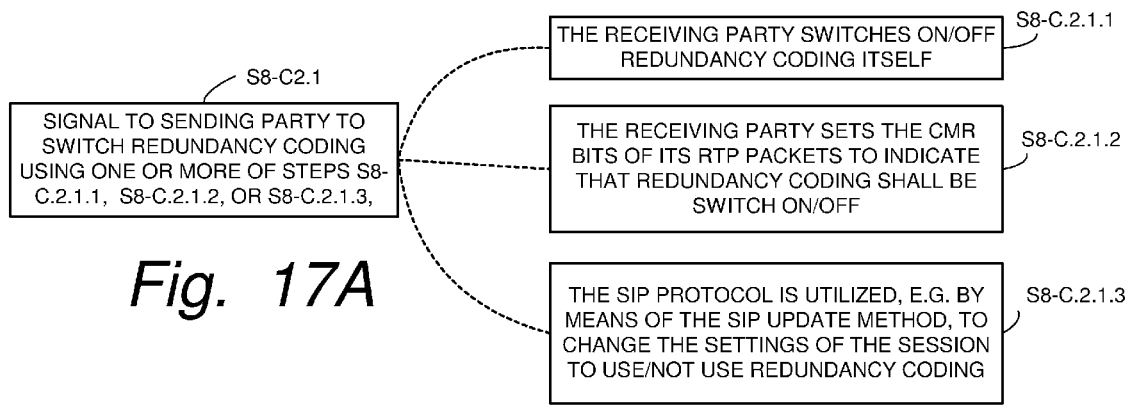
FIG. 17A and FIG. 17B are flowcharts showing substeps of selected steps or events of the eight scenario of adaptive redundancy.

As step S8-C, the receiving party follows the second scenario (S2) above, e.g., monitoring lost packets in its receiving buffer (step S8-C.1). As step S8-C.2, when the wireless station 30, by examining its received packets, discovers that the packet loss rate reaches and/or exceeds a given threshold trigger as depicted by FIG. 16E, event (step) S8-C.2.1 is performed, In particular, as step S8-C.2.1, the receiving party/ station signals to the sending wireless party/station to switch (either on/off) the redundancy coding. Such signaling to the sending mobile can be performed in various, such as one or more (e.g., in combination) of the following (see FIG. 17A):

Step S8-C.2.1.1 The receiving party switches on/off redundancy coding itself.

Step S8-C.2.1.2 The receiving party sets the CMR bits of its RTP packets to indicate that redundancy coding shall be switch on/off.

Step S8-C.2.1.3 The SIP protocol is utilized, e.g. by means of the SIP update method, to change the settings of the session to use/not use redundancy coding.

As step S8-D, the steps S8-A, S8-B, and S8-C can be repeated as necessary.

Figure 17B:
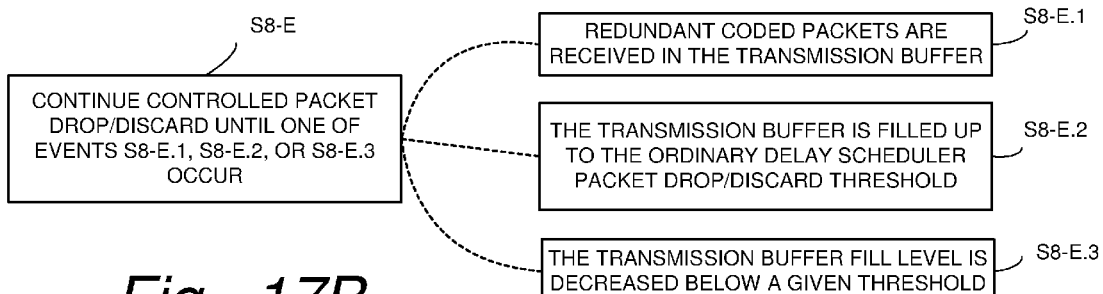

As step S8-E, the controlled drop/discard of packets continues until one or more of the following events S8-E.1, S8-E.2, or S8-E.3 occur (see FIG. 17B):

Step S8-E.1: Redundant coded packets are received in the transmission buffer. FIG. 16F illustrates reception of redundant coded packets in the transmission buffer.

Step S8-E.2: The transmission buffer is filled up to the ordinary delay scheduler packet drop/discard threshold.

Step S8-E.3: The transmission buffer fill level is decreased below a given is threshold.

As step S8-F, the steps S8-A, S8-B, and S8-C can be repeated as necessary.

Figure 18:
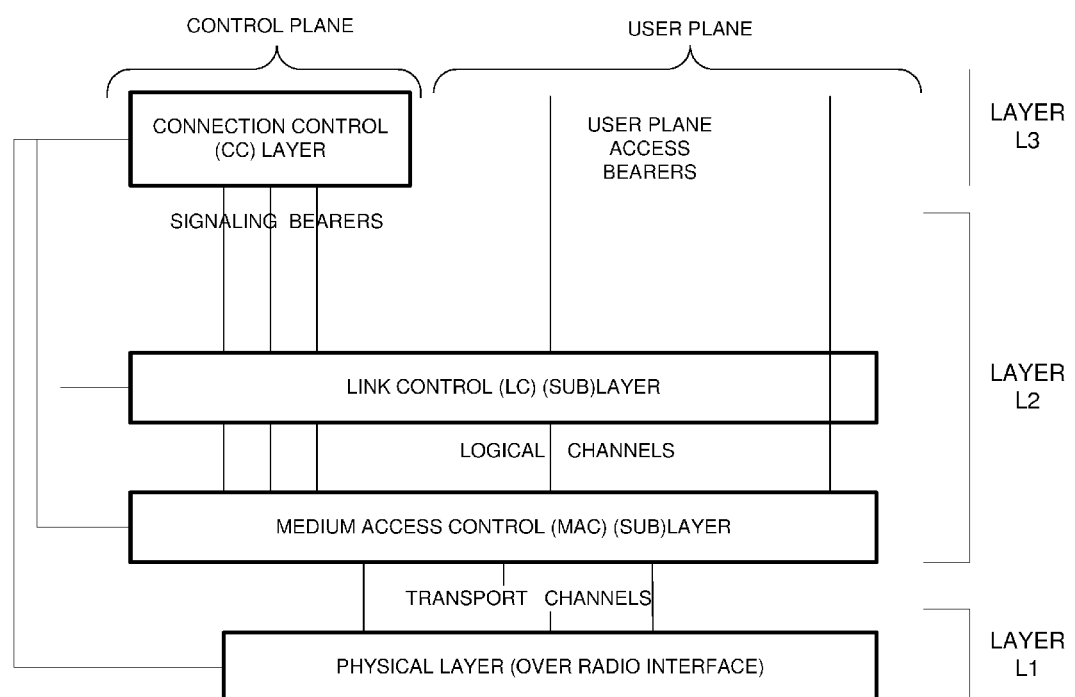
FIG. 18 is a diagrammatic view of network layers in a network suitable for use with adaptive redundancy.

In the eighth scenario (S8) the monitored buffer is a MAC-hs transmission buffer. The concepts of medium access control (MAC) are generally illustrated with reference to FIG. 18. FIG. 18 illustrates protocol layers above the physical layer (layer L1) as being the data link layer (layer L2) and the network layer (layer L3). Layer L2 is split into sublayers. In the control plane, layer L2 contains two sublayers—a first sublayer with the Medium Access Control (MAC) protocol and a second sublayer with the Connection Control (CC) protocol. Layer L3 has the Connection Control (CC) protocol, which belongs to the control plane. Layer L2 and Layer L3 are analogous to the layers of the UTRAN, the UTRAN layers being described by Holma and Toskala, WCDMA For UMTS Radio Access For Third Generation Mobile Communications, John Wiley & Sons, Ltd., 2000, which is incorporated herein by reference. The physical layer L1 offers services to the MAC layer via transport channels that are characterized by how and with what characteristics the data is transferred. The MAC layer, in turn, offers services to the Link Control (LC) layer by means of logical channels. The logical channels are characterized by what type of data is transmitted. The Link Control (CC) layer offers services to higher layers via service access points (SAPs), which describe how the Link Control (CC) layer handles the data packets. On the control plane, the Link Control (CC) services are used by the Connection Control (CC) layer for signalling transport. On the user plane, the Link Control (CC) services are used by higher-layer u-plane functions (e.g. speech codec). The Link Control (CC) services are called Signalling Bearers in the control plane and Access Bearers in the user plane.

Figure 19:
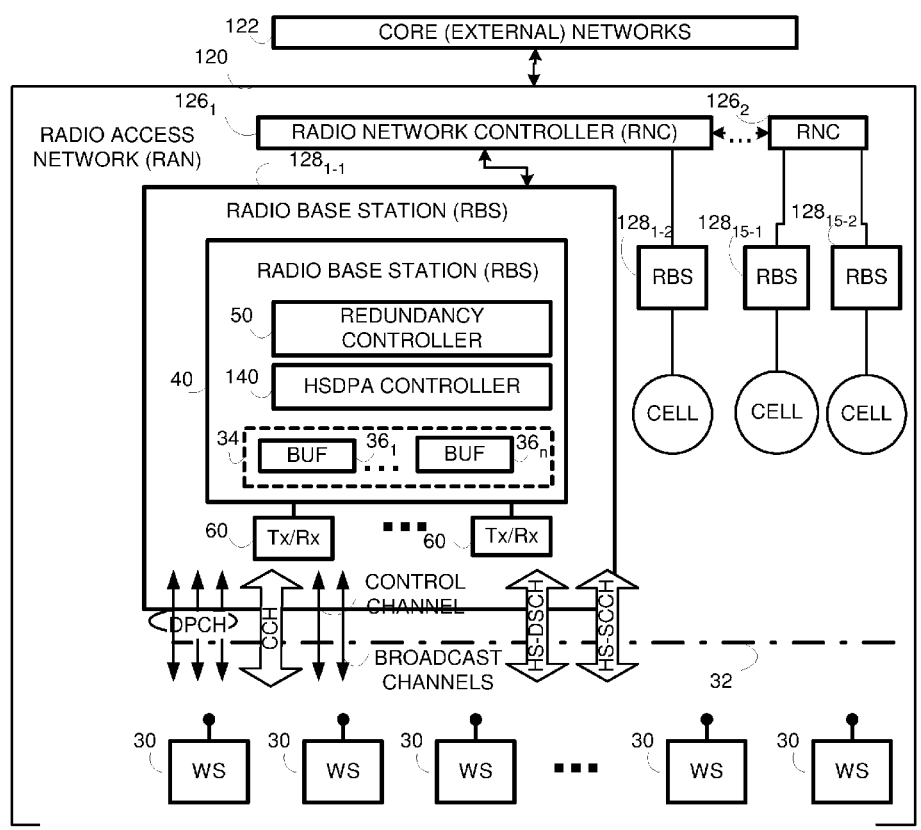
FIG. 19 is schematic view of example communications system in which High Speed Downlink Packet Access (HSDPA) may be advantageously employed.

FIG. 19 shows example mobile communications system in which High Speed Downlink Packet Access (HSDPA) may be advantageously employed, and which is an example appropriate for the embodiment of the eighth scenario (S8). FIG. 19 illustrates an example, non-limiting telecommunications system wherein a radio access network 120 is connected to one or more external (e.g., core) networks 122. The external networks 122 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN). Each of the core network service nodes connects to the radio access network (RAN) 120 over a suitable interface. In the particular, non-limiting example shown in FIG. 19, the radio access network (RAN) 120 is a UMTS Terrestrial Radio Access Network (UTRAN) and the interface with the external network is over the Iu interface. The radio access network (RAN) 120 includes one or more radio network controllers (RNCs) 126 and one or more radio base stations (RBS) 128. For sake of simplicity, the radio access network (RAN) 120 of FIG. 19 is shown with only two RNC nodes, particularly RNC 126$_1$ and RNC 126$_2$. Each RNC 126 is connected to one or more base stations (BS) 128 over an Iub interface. For example, and again for sake of simplicity, two base station nodes are shown connected to each RNC 126. In this regard, RNC 126$_1$ serves base station 128$_{1-1}$ and base station 128$_{1-2}$, while RNC 126$_2$ serves base station 128$_{2-1}$ and base station 128$_{2-2}$. It will be appreciated that a different number of base stations can be served by each RNC, and that RNCs need not serve the same number of base stations. Moreover, FIG. 19 shows that an RNC can be connected over an Iur interface to one or more other RNCs in the UTRAN 124. Further, those skilled in the art will also appreciate that a base station is sometimes also referred to in the art as a radio base station, a node B, or B-node. It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In FIG. 19, for sake of simplicity each base station 128 is shown as serving one cell. For base station 128$_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers. As shown in FIG. 19, wireless stations 30 communicates with one or more cells or one or more base stations (BS) 128 over a radio or air interface 32.

FIG. 19 further illustrates in simplified form that different types of channels may exist between one of the base stations 128 and wireless station 30 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH). The downlink dedicated physical channel (DPCH) carries both the Dedicated Physical Data Channel (DPDCH) and the Dedicated Physical Control Channel (DPCCH). A high-speed shared control channel (HS-SCCH) is utilized for signaling purposes. A HSDPA controller 140, commonly referred to also as a HSDPA scheduler, is provided. The HS-SCCH contains information which is sent to the wireless terminals so that the wireless terminals know if they have data to receive on the HS-PDSCh channel or not. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI. The HSDPA controller 140 may be included with or separate from a node controller or the like which bears responsibility for overall operation/coordination of the RBS node. Further, the HSDPA controller 140 may be implemented using individual hardware circuits, using software programs and data in conjunction with one or more suitably programmed digital microprocessors or general purpose computers, using application specific circuitry (ASIC), and/or using one or more digital signal processors (DSPs). Various functionalities of HSDPA controller 140 and HSDPA-related entities of radio base station 128 not described herein are understood with reference to U.S. patent application Ser. No. 11/024,942, filed Dec. 30, 2004, entitled "FLOW CONTROL AT CELL CHANGE FOR HIGH-SPEED DOWNLINK PACKET ACCESS"; which is incorporated herein by reference.

The technology described above is not confined it to HSDPA, as it can be applicable to other radio access networks.

With selective redundancy not every RTP packet will carry information from previous voice frame(s). Instead the redundancy controller will select voice frames, which are troublesome to conceal by the ECU (Error Concealment Unit) to be included in next packet or packets].

At various points above, the disclosure refers to a receiving mobile and a sending mobile. The technology is not confined to a connection in which both parties are wireless stations, as one endpoint may well be on a "fixed network".

Various factors can be taken into consideration in determining how the buffer thresholds that trigger the redundancy should be set. One factor is voice quality, for example the packet loss rate should not exceed 2%. Another factor could be to tune the delay pre-thresholds to the round trip times of the MAC-hs HARQ scheme.

The location of the CMR bits in the RTP packet format is understood with reference to IETF RFC 3267, which is incorporated herein by reference. The CMR bits have been used for changing the Mode of the AMR speech codec, for example to switch between AMR 12.2 kbps to AMR 7.95 kbps. There are other ways the redundancy change could be implemented other than via CMR bits. For example, via the SIP (IETF RFC 3261) protocol using for example SIP INVITE or SIP UPDATE method with new SDP (IETF RFC RFC2327) parameters, which is incorporated herein by reference.

The SIP update mentioned above is understood with reference to, e.g., IETF RFC 3311, page 10, which is incorporated herein by reference.

RTCP-RR/SR reports are generated in the receiver and transmitted back to the RTP sender. RCTP reports are uniquely identifiable by a 32 bits source identifier for which the reports are reporting on. The RTCP packets are often using the one higher port number of the underlying transport protocol. For example if the RTP data is using port 350, the RTCP protocol would use port 351. The reports are periodically generated, however it is recommended that RTCP do not use more than 5% of the available bandwidth. Both the Sender Reports and receiver reports, contain at least three field that are of interest, those are; "fraction lost", "cumulative number of packets lost", and "inter-arrival jitter". A description of these fields is found in IETF RFC is 3550, which is incorporated herein by reference. These could be used to trigger the application-codec to switch on redundancy coding.

In order to determine end-to-end (e2e) delay time for a RTP packet, the wireless station can use the RTCP SR and RR reports to get an estimate of the round trip time (RTT), and then divide that by two. This would give a fairly good estimate of the end-to-end delay. So, the sender would take a timestamp$_{sent\ when}$ it generates a SR report, when it later receives a report block it would take another timestamp$_{receive}$. In the received report block it would retrieve the time from when the receiver got the SR report and until it sent the report block, and subtract that time from the (timestamp$_{receive}$-timestamp$_{sent}$) and divide that with 2. The report block has a field called "delay since last SR" which holds the from when the receiver got the SR report and until it sent the report block.

Figure 20:
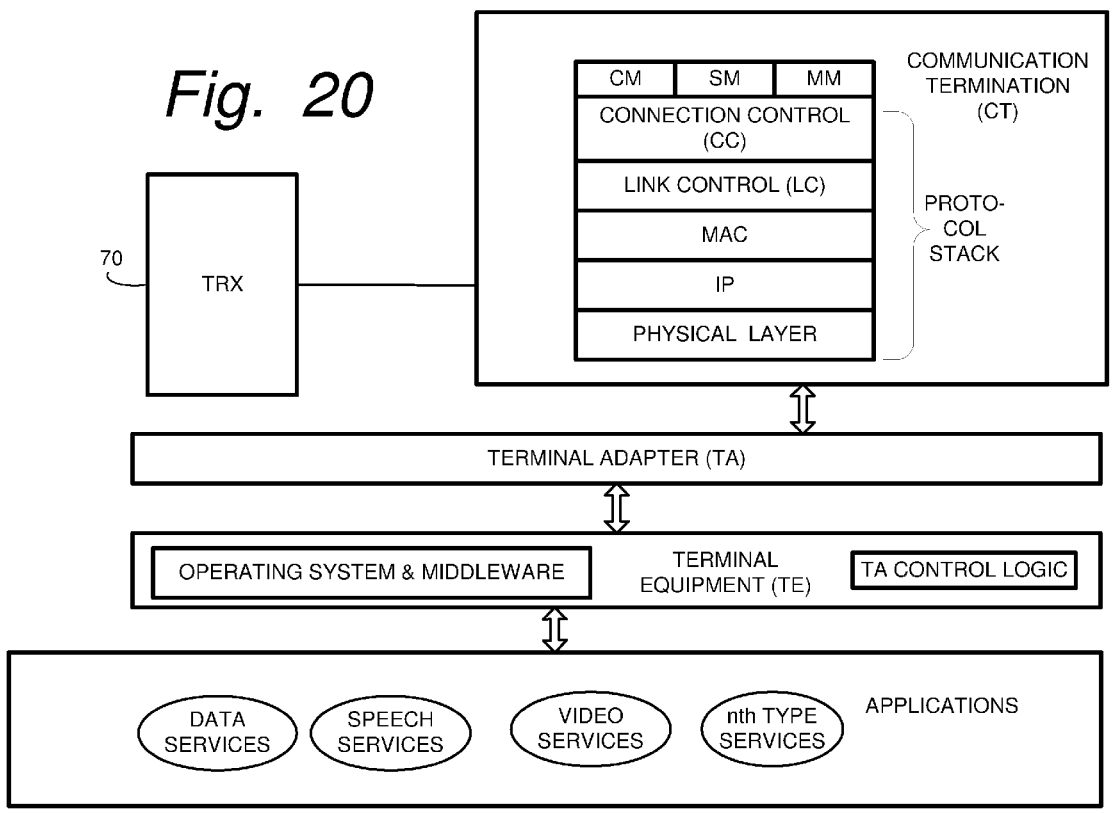
FIG. 20 is a diagrammatic view of example functional entities included in an example wireless station having integrated applications.

Other functional entities for an example, representative, non-limiting wireless station 30 are illustrated in FIG. 20. These general functional entities include: communication termination entity (CT); terminal adapter (TA); terminal equipment; and, a set of applications. In an illustrated example embodiment, communication termination entity (CT) includes the protocol handler 78. The terminal adapter (TA) generally acts as an adaptation between communication termination entity (CT) and the applications. Communication termination entity (CT) includes control management (CM) functions; service management (SM) functions; mobility management (MM) functions; and, the protocol stack handled by protocol handler 78. It should be recalled, however, that in certain embodiments the network node does not generate the redundancy information for inclusion in the packets, while in other embodiments such capability does exist, as explained below.

Figure 22:
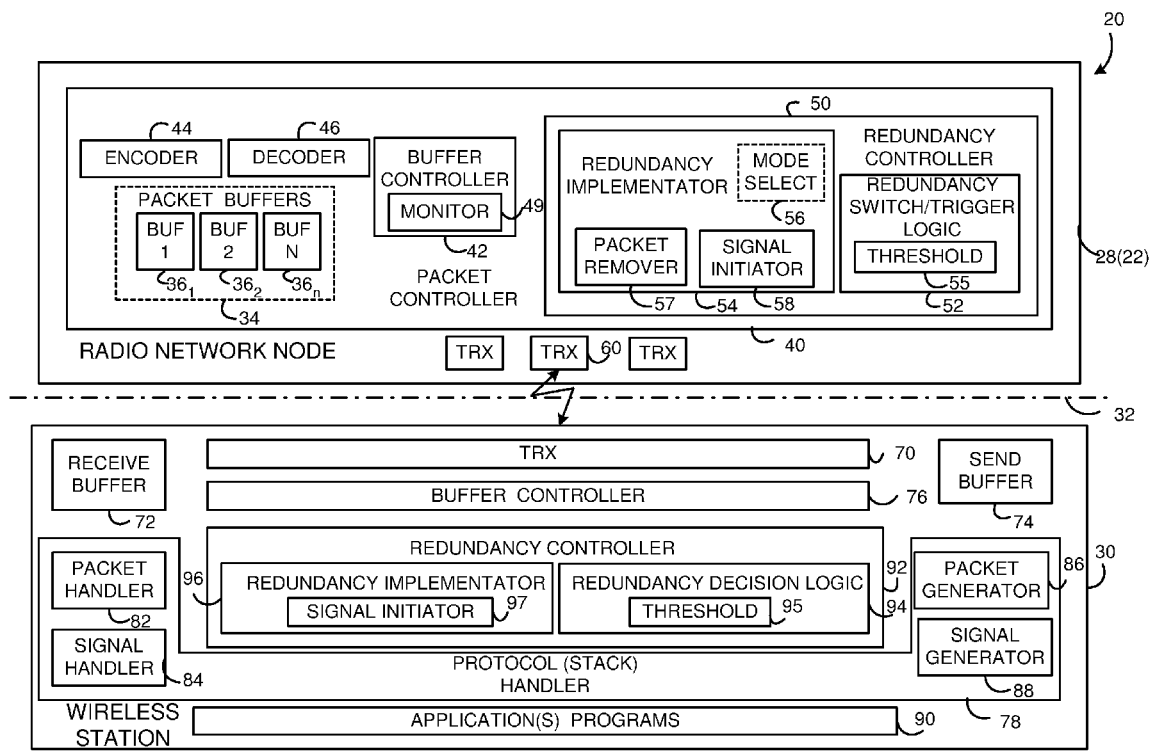
FIG. 22 is a schematic view of portions of another example, representative, non-limiting embodiment of a communications network having adaptive redundancy.

The embodiment of FIG. 22 resembles that of FIG. 1, but in the embodiment of FIG. 22 the radio network node 28(22) further includes an encoder 44 and a decoder 46. Whereas in previously described embodiments the radio network node primarily signaled the need for redundancy to one or more endpoints of the connection, the radio network node 28(22) of FIG. 22 actually performs the redundancy coding, e.g. resends some or all of the content of one packet also in the next packet (e.g., the amount of the information resent depends on the redundancy mode, either full, is partial, or selective). In the radio network node 28(22) of FIG. 22, thus, one of the functions of encoder 44 is to implement the mode or degree of redundancy which, at any moment, is determined by redundancy controller 50 to be appropriate for a particular packet. The buffer controller 42 also stores packets received on the uplink from wireless station 30 in an appropriate reception packet in the pool 34 of buffers. Decoder 44 serves, e.g., for packets so obtained from wireless station 30 and stored in one of the buffers 36, to prepare the content of such packets for higher protocol or use by a higher network node, including any attempts to resolve any reception issues related to redundancy (e.g., recovery of lost or distorted frames, for example). As an alternative, the example radio network node could also be a "core network node" also, but then without the radio part.

The foregoing introduces redundancy coding in such a way that the VoIP application bit rate is not increased, e.g. by reducing the codec rate when redundancy coding is applied, the system capacity is increased and the same voice quality is maintained.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiments.

What is claimed is:

1. A method of operating a telecommunications network comprising:
   monitoring an indicator for a flow of packets, the packets carrying voice and/or audio over a packet switched connection involving a wireless station, for determining a need for redundancy of at least some packet content for the packets;
   in accordance with the monitoring, selecting and implementing one of plural redundancy modes as an implemented redundancy mode, the plural redundancy modes including a full redundancy mode, a partial redundancy mode, and a selective redundancy mode;
   wherein in each of the plural redundancy modes contents of certain mode-specific packets are, upon initially transmission in the packet switched connection, redundantly transmitted in two consecutive packets, the certain mode-specific packets being:
   all packets for the full redundancy mode;
   packets that hold onset voice frames for the selective redundancy mode; and
   packets that have parameters that need to be duplicated for the partial redundancy mode;
   adaptively switching among the plural redundancy modes and a no redundancy mode in accordance with the monitoring; and
   wherein outgoing packets are coded in accordance with the implemented redundancy mode until a switching to another mode, the switching also being in accordance with the monitoring.

2. The method of claim 1, wherein the indicator is obtained from a buffer wherein the packets of the flow are at least temporarily stored, and wherein the monitoring of the indicator comprises comparing the indicator to a threshold.

3. The method of claim 2, wherein the buffer is a transmission buffer of a network node, and wherein the indicator is related to a number of packets resident in the transmission buffer.

4. The method of claim 3, wherein the buffer is a medium access control (MAC) high speed buffer of the network node.

5. The method of claim 2, wherein the buffer is a reception buffer of a wireless station, and wherein the indicator is related to a number of packets lost from the reception buffer.

6. The method of claim 2, wherein the buffer is a reception buffer of a wireless station, and wherein the indicator is related to packet delay in the reception buffer.

7. The method of claim 2, wherein the buffer is a reception buffer of a wireless station, and wherein the indicator is related to packet jitter in the reception buffer.

8. The method of claim 2, wherein the buffer is a transmission buffer of a wireless station, and wherein the indicator is related to a number of packets resident in the transmission buffer.

9. The method of claim 1, wherein the indicator is a statistic regarding the flow and wherein the statistic is obtained from RTCP protocol.

10. The method of claim 1, wherein the indicator is related to uplink activity of the connection from a wireless station to a network node.

11. The method of claim 10, wherein the indicator is related to uplink grants for the connection.

12. The method of claim 10, wherein the indicator is related to uplink negative acknowledgments occurring for the connection.

13. The method of claim 1, wherein adaptively switching comprises directing a first client involved in the connection to switch between redundancy modes.

14. The method of claim 13, wherein adaptively switching comprises directing a first client involved in the connection to switch between redundancy modes by changing redundancy indication bits of a packet.

15. The method of claim 13, wherein adaptively switching comprises directing a first client involved in the connection to switch between redundancy modes by changing change mode request (CMR) bits of a RTP packet.

16. The method of claim 13, further comprising the first client involved in the connection signaling a second client involved in the connection to switch between redundancy modes.

17. The method of claim 16, wherein the first client involved in the connection signals a second client involved in the connection by changing change mode request (CMR) bits of a RTP packet.

18. The method of claim 17, wherein the first client involved in the connection signals a second client involved in the connection by using a session initiation protocol (SIP) update.

19. The method of claim 1, wherein adaptively switching comprises removing at least some packets from a transmission buffer when a number of packets in the transmission buffer reaches a pre-discard delay threshold.

20. The method of claim 1, wherein adaptively switching comprises removing at least some packets from a transmission buffer when a number of packets in the transmission buffer reaches a pre-discard delay threshold and continuing to remove packets from the transmission buffer until one or more of the following occur:
  redundant coded packets are received in the transmission buffer;
  the transmission buffer is filled up to an ordinary delay drop/discard threshold;
  a transmission buffer fill level is decreased below a predetermined threshold
  the packet drop rate exceeds a given total user packet loss rate.

21. The method of claim 1, wherein the packets are Voice over Internet Protocol (VoIP) packets.

22. A node of a telecommunications network comprising:
  a monitor configured to monitor an indicator for a flow of packets between a first party and a second party, the packets carrying voice and/or audio over a packet switched connection;
  a redundancy controller configured to use the indicator for adaptively making a determination of a need for redundancy of at least some packet content for the packets and for selecting and implementing one of plural redundancy modes as an implemented redundancy mode, the plural redundancy modes including a full redundancy mode, a partial redundancy mode, and a selective redundancy mode;
  wherein in each of the plural redundancy modes contents of certain mode-specific packets are, upon initial transmission in the packet switched connection, redundantly transmitted in two consecutive packets, the certain mode-specific packets being:
    all packets for the full redundancy mode;
    packets that hold onset voice frames for the selective redundancy mode; and
    packets that have parameters that need to be duplicated for the partial redundancy mode;
  the redundancy controller further being configured to adaptively switch among the plural redundancy modes and a no redundancy mode in accordance with the indicator;
  wherein outgoing packets are coded in accordance the implemented redundancy mode until a switching to another mode, the switching also being in accordance with the indicator.

23. The apparatus of claim 22, further comprising a packet transmission buffer for storing packets of the flow, and wherein the monitor monitors packets in the transmission buffer.

24. The apparatus of claim 23, wherein the transmission buffer is a medium access control (MAC) high speed buffer.

25. The apparatus of claim 22, wherein the redundancy trigger logic makes the determination by comparing the indicator to a threshold.

26. The apparatus of claim 22, wherein the redundancy controller adaptively switching comprises directing the first party to switch between redundancy modes.

27. The method of claim 26, wherein the directing the first party to switch between redundancy modes comprises changing redundancy indication bits of a packet.

28. The apparatus of claim 26, wherein the directing the first party to switch between redundancy modes comprises changing change mode request (CMR) bits of a RTP packet.

29. The apparatus of claim 26, further comprising the first party involved in the connection signaling a second party involved in the connection to switch between redundancy modes.

30. The apparatus of claim 29, wherein the first party involved in the connection signals a second party involved in the connection by changing change mode request (CMR) bits of a RTP packet.

31. The apparatus of claim 29, wherein the first party involved in the connection signals a second party involved in the connection by using a session initiation protocol (SIP) update.

32. The apparatus of claim 22, wherein the redundancy controller removes at least some packets from a transmission buffer when a number of packets in the transmission buffer reaches a pre-discard delay threshold.

33. The apparatus of claim 22, wherein the redundancy controller removes at least some packets from a transmission buffer when a number of packets in the transmission buffer reaches a pre-discard delay threshold and continues to remove the packets from the transmission buffer until one or more of the following occur:
- redundant coded packets are received in the transmission buffer;
- the transmission buffer is filled up to an ordinary delay drop/discard threshold;
- a transmission buffer fill level is decreased below a predetermined threshold
- the packet drop rate exceeds a given total user packet loss rate.

34. The node of claim 22, wherein the packets are Voice over Internet Protocol (VoIP) packets.

35. A wireless station which communicates as a first party over an air interface with a telecommunications network, the wireless station comprising:
- a monitor configured to monitor an indicator for a flow of packets in a packet switched connection with a second party, the packets carrying voice and/or audio;
- a redundancy controller configured to use the indicator for adaptively making a determination of a need for redundancy of at least some packet content for the packets and for selecting and implementing one of plural redundancy modes as an implemented redundancy mode, the plural redundancy modes including a full redundancy mode, a partial redundancy mode, and a selective redundancy mode;
- wherein in each of the plural redundancy modes contents of certain mode-specific packets are, upon initial transmission in the packet switched connection, redundantly transmitted in two consecutive packets, the certain mode-specific packets being:
  - all packets for the full redundancy mode;
  - packets that hold onset voice frames for the selective redundancy mode; and
  - packets that have parameters that need to be duplicated for the partial redundancy mode;
- the redundancy controller further being configured to adaptively switch among the plural redundancy modes and a no redundancy mode in accordance with the indicator; and
- wherein outgoing packets are coded in in accordance with the implemented redundancy mode until a switching to another mode, the switching also being in accordance with the indicator.

36. The apparatus of claim 35, wherein the indicator is obtained from a buffer wherein the packets of the flow are at least temporarily stored.

37. The apparatus of claim 36, wherein the redundancy trigger logic compares the indicator to a threshold.

38. The apparatus of claim 36, wherein the buffer is a reception buffer of the wireless station, and wherein the indicator is related to a number of packets lost from the reception buffer.

39. The apparatus of claim 36, wherein the buffer is a reception buffer of a wireless station, and wherein the indicator is related to packet delay in the reception buffer.

40. The apparatus of claim 36, wherein the buffer is a reception buffer of a wireless station, and wherein the indicator is related to packet jitter in the reception buffer.

41. The apparatus of claim 36, wherein the buffer is a transmission buffer of a wireless station, and wherein the indicator is related to a number of packets resident in the transmission buffer.

42. The apparatus of claim 35, wherein the indicator is related to uplink activity of the connection from a wireless station to a network node.

43. The apparatus of claim 42, wherein the indicator is related to uplink grants for the connection.

44. The apparatus of claim 42, wherein the indicator is related to uplink negative acknowledgments occurring for the connection.

45. The apparatus of claim 35, wherein the wireless station signals the second party to switch between redundancy modes.

46. The apparatus of claim 45, wherein the wireless station signals the second party by changing change mode request (CMR) bits of a RTP packet.

47. The apparatus of claim 45, wherein the wireless station signals the second party using a session initiation protocol (SIP) update.

48. The apparatus of claim 35, wherein the packets are Voice over Internet Protocol (VoIP) packets.

* * * * *

UNITED STATES PATENT AND TRADEMARK OFFICE
CERTIFICATE OF CORRECTION

| | |
|---|---|
| PATENT NO. | : 7,787,377 B2 |
| APPLICATION NO. | : 11/278740 |
| DATED | : August 31, 2010 |
| INVENTOR(S) | : Hannu et al. |

It is certified that error appears in the above-identified patent and that said Letters Patent is hereby corrected as shown below:

On the Title Page, item (75), under "Inventors", in Column 1, Line 1, delete "Lulea" and insert -- Luleå --, therefor.

On the Title Page, item (75), under "Inventors", in Column 1, Line 1, delete "Marten" and insert -- Mårten --, therefor.

On the Title Page, item (75), under "Inventors", in Column 1, Line 2, delete "Lulea" and insert -- Luleå --, therefor.

On the Title Page, item (75), under "Inventors", in Column 1, Line 3, delete "Lulea" and insert -- Luleå --, therefor.

On Page 2, item (56), under "OTHER PUBLICATIONS", in Column 2, Line 4, delete "VOIP"," and insert -- VoIP", --, therefor.

In Column 1, Line 22, after "access" delete "is".

In Column 1, Line 56, after "for" delete "is".

In Column 3, Line 40, delete "Connections";" and insert -- Connections". --, therefor.

In Column 3, Line 42, after "particular" delete "is".

In Column 6, Line 8, delete "use is" and insert -- use --, therefor.

In Column 6, Line 53, after "scale," delete "is".

In Column 7, Line 63, after "will" delete "is".

Signed and Sealed this
First Day of February, 2011

David J. Kappos
*Director of the United States Patent and Trademark Office*

CERTIFICATE OF CORRECTION (continued)

U.S. Pat. No. 7,787,377 B2

In Column 8, Line 37, delete "for is" and insert -- for --, therefor.

In Column 12, Line 28, after "threshold" delete "is".

In Column 14, Line 60, delete "and/or is" and insert -- and/or --, therefor.

In Column 14, Line 63, delete "voip" and insert -- VoIP --, therefor.

In Column 15, Line 5, delete "RTPC)" and insert -- RTCP) --, therefor.

In Column 16, Line 4, delete "to is" and insert -- to --, therefor.

In Column 16, Line 44, delete "to a is" and insert -- to a --, therefor.

In Column 17, Line 17, delete "is 96" and insert -- 96 --, therefor.

In Column 17, Line 58, delete "stack is" and insert -- stack --, therefor.

In Column 20, Line 55, delete "given is" and insert -- given --, therefor.

In Column 21, Line 13, delete "(CC)" and insert -- (LC) --, therefor.

In Column 21, Line 15, delete "(CC)" and insert -- (LC) --, therefor.

In Column 21, Line 16, delete "(CC)" and insert -- (LC) --, therefor.

In Column 21, Line 18, delete "(CC)" and insert -- (LC) --, therefor.

In Column 21, Line 20, delete "(CC)" and insert -- (LC) --, therefor.

In Column 21, Line 39, delete "GRPS" and insert -- GPRS --, therefor.

In Column 23, Line 19, delete "RCTP" and insert -- RTCP --, therefor.

In Column 23, Line 30, delete "RFC is" and insert -- RFC --, therefor.

In Column 23, Line 38, delete "$tamp_{sent\ when}$" and insert -- $tamp_{sent}$ when --, therefor.

In Column 23, Line 44, delete "from" and insert -- form --, therefor.

In Column 24, Line 5, delete "is partial," and insert -- partial, --, therefor.

In Column 26, Lines 35-36, in Claim 22, delete "indicator;" and insert -- indicator; and --, therefor.

In Column 26, Line 37, in Claim 22, delete "accordance" and insert -- accordance with --, therefor.

CERTIFICATE OF CORRECTION (continued)
U.S. Pat. No. 7,787,377 B2

In Column 26, Line 54, in Claim 27, delete "method" and insert -- apparatus --, therefor.

In Column 27, Line 23, in Claim 34, delete "node of" and insert -- apparatus of --, therefor.

In Column 28, Line 5, in Claim 35, delete "in in" and insert -- in --, therefor.